United States Patent
Hewett et al.

(10) Patent No.: US 10,628,789 B2
(45) Date of Patent: Apr. 21, 2020

(54) COMMUNICATION DEVICE FOR VENDING MACHINE AND METHOD OF USING THE SAME

(71) Applicant: Gimme Vending LLC, Atlanta, GA (US)

(72) Inventors: Cory Yost Hewett, Fayetteville, GA (US); Evan Nicholas Jarecki, Savannah, GA (US)

(73) Assignee: Gimme Vending LLC, Atlanta, GA (US)

( * ) Notice: Subject to any disclaimer, the term of this patent is extended or adjusted under 35 U.S.C. 154(b) by 754 days.

(21) Appl. No.: 14/687,577

(22) Filed: Apr. 15, 2015

(65) Prior Publication Data

US 2015/0339621 A1 Nov. 26, 2015

Related U.S. Application Data

(60) Provisional application No. 62/000,769, filed on May 20, 2014, provisional application No. 62/091,780, filed on Dec. 15, 2014.

(51) Int. Cl.
| | |
|---|---|
| *G06Q 10/08* | (2012.01) |
| *G07F 7/00* | (2006.01) |
| *G06Q 20/18* | (2012.01) |
| *G06Q 20/32* | (2012.01) |
| *G07F 9/02* | (2006.01) |

(52) U.S. Cl.
CPC ........... *G06Q 10/087* (2013.01); *G06Q 20/18* (2013.01); *G06Q 20/32* (2013.01); *G06Q 20/322* (2013.01); *G07F 7/00* (2013.01); *G07F 9/026* (2013.01)

(58) Field of Classification Search
USPC .......................................................... 705/28
See application file for complete search history.

(56) References Cited

U.S. PATENT DOCUMENTS

| | | | |
|---|---|---|---|
| 6,844,813 B2 | 1/2005 | Hardman | |
| 7,103,008 B2 * | 9/2006 | Greenblat | G06F 15/78 370/258 |
| 7,190,949 B2 | 3/2007 | Tsuda et al. | |
| 7,458,510 B1 | 12/2008 | Zhou | |
| 7,480,803 B1 | 1/2009 | Marballi | |

(Continued)

OTHER PUBLICATIONS

U.S. Notice of Allowance on U.S. Appl. No. 14/717,484 dated Aug. 19, 2015.

*Primary Examiner* — Garcia Ade
(74) *Attorney, Agent, or Firm* — Foley & Lardner LLP

(57) ABSTRACT

The present application is directed to systems and methods for transmitting vending machine data wirelessly via a reporting device. Each vending machine may connect to a reporting device. The reporting device may communicate with a mobile device wirelessly, where the mobile device may be carried by an operator. The reporting device may transmit vending machine data to the mobile device. The reporting device may transmit maintenance information to the mobile device. The mobile device may upload the vending machine data and maintenance information via a network to a remote device. The reporting device may enable a customer to make purchases with a mobile device. The reporting device may receive a repair-needed notification from a customer's mobile device.

4 Claims, 13 Drawing Sheets

(56) References Cited

U.S. PATENT DOCUMENTS

| | | |
|---|---|---|
| 7,821,395 B2 | 10/2010 | Denison et al. |
| 8,459,497 B2 | 6/2013 | Milan et al. |
| 8,473,864 B2 | 6/2013 | Segal et al. |
| 8,788,341 B1 | 7/2014 | Patel et al. |
| 9,026,461 B2 | 5/2015 | Calman et al. |
| 2014/0316875 A1* | 10/2014 | Tkachenko ............ G07F 11/002 705/14.25 |
| 2017/0364886 A1* | 12/2017 | Barragan Trevino .. G05B 15/02 |

* cited by examiner

COMMUNICATION DEVICE FOR VENDING MACHINE AND METHOD OF USING THE SAME

RELATED APPLICATIONS

The present Application for Patent claims priority to U.S. Provisional Application No. 62/000,769, titled "AUTOMATED MERCHANDISING," filed May 20, 2014, and U.S. Provisional Application No. 62/091,780, titled "COMMUNICATION DEVICE FOR VENDING MACHINE," filed Dec. 15, 2014, both assigned to the assignee hereof and both hereby expressly incorporated by reference herein.

BACKGROUND

This disclosure generally relates to a communication device for a vending machine and a method for using the same. In particular, this disclosure relates to receiving data from a vending machine and transmitting it to a computing device. In addition, this disclosure relates to a vending machine management system.

Vending machines are found in many different areas: malls, offices, airports, etc. A vending machine may store various items such as foods, beverages, toys, gift cards, electronic devices, etc. Each item available for purchase may have a purchase price and may be dispensed when a user selects the item and provides sufficient funds. A vending machine may accept cash, credit cards, near field communication devices, or other forms of payment.

To restock a vending machine, an operator may count a number of items needed for each type of item. The operator may open up the vending machine and replace the number of items. For instance, the operator may count five bags of jelly beans needed and two bags of potato chips needed. The operator may then restock the vending machine with five bags of jelly beans and two bags of potato chips.

An operator may also need to service a vending machine. To service a vending machine, the operator may take out some or all of the cash from the vending machine, fix any items that are stuck inside, adjust the pricing of one or more items, or fix the vending machine in any other way.

An owner or operator of vending machines may need to restock and/or service the vending machines. In some instances, a plurality of vending machines may be spread out in a small geographic area, e.g. in a same building. In some instances, a subset of the plurality of vending machines may be in a small geographic area while another subset may be in a different geographic area, e.g. a different building.

SUMMARY

The systems, methods and devices of this disclosure each have several innovative aspects, no single one of which is solely responsible for the desirable attributes disclosed herein.

One innovative aspect of the subject matter described in this disclosure can be implemented in a communication device for a vending machine. The device can include a vending machine interface, a wireless communication interface, a memory element, and a processor. The processor can receive vending machine data from the vending machine interface, the vending machine data identifying products sold. The processor can store, in the memory element, the received vending machine data. The processor can establish, using the wireless communication interface, a connection to a device. And the processor can transmit, via the wireless communication interface, the vending machine data to the device.

In some implementations, the processor can enter into a sleep mode when inactive, exit the sleep mode periodically, and attempt to establish a connection to the device.

In some implementations, the vending machine data can include a low-inventory notification. In some implementations, the vending machine data can include payment data, the payment data indicating the form of payment used for a transaction.

In some implementations, the processor can receive, via the wireless communication interface, a payment made from a second device. The processor can store, in the memory element, a record of the payment. And the processor can transmit, via the vending machine interface, an instruction to the vending machine to dispense an item associated with the payment. In some implementations, the payment made from the second device can be in the form of a promotional credit.

In some implementations, the processor can receive, via the wireless communication interface, a repair-needed notification from a second device. The processor can store, in the memory element, the repair-needed notification. And the processor can transmit, via the wireless communication interface, the repair-needed notification to the device.

In some implementations, the processor can establish, using the wireless communication interface, a connection to a second device. And the processor can transmit, via the wireless communication interface, the vending machine data to the second device.

Another innovative aspect of the subject matter described in this disclosure can be implemented in a method of communicating with a vending machine via a communication device having a vending machine interface, a wireless communication interface, a memory element, and a processor. The method can include receiving vending machine data from the vending machine interface, the vending machine data identifying products sold. The method can include storing, in the memory element, the received vending machine data. The method can include establishing, using the wireless communication interface, a connection to a device. The method can include transmitting, via the wireless communication interface, the vending machine data to the device.

In some implementations, the method can include entering the communication device into a sleep mode when inactive, exiting the sleep mode periodically, and attempting to establish a connection to the device.

In some implementations, the method can include receiving, via the wireless communication interface, a payment made from a second device. The method can include storing, in the memory element, a record of the payment. The method can include transmitting, via the vending machine interface, an instruction to the vending machine to dispense an item associated with the payment.

In some implementations, the method can include receiving, via the wireless communication interface, a repair-needed notification from a second device. The method can include storing, in the memory element, the repair-needed notification. The method can include transmitting, via the wireless communication interface, the repair-needed notification to the device.

In some implementations, the method can include establishing, using the wireless communication interface, a connection to a second device. The method can include transmitting, via the wireless communication interface, the vending machine data to the second device.

Another innovative aspect of the subject matter described in this disclosure can be implemented in a vending machine management system including a communication device for a vending machine and a mobile computing device. The communication device for a vending machine can include a processor, a vending machine interface for receiving vending machine data from the vending machine interface, a memory element for storing the received vending machine data, and a first wireless communication interface for transmitting and receiving data and instructions. The vending machine data can identify products sold. The mobile computing device an include a second wireless communication interface for establishing a connection to the first wireless communication interface and a computer network, the second wireless communication interface receiving the stored vending machine data from the communication device.

In some implementations, the communication device can receive, via the wireless communication interface, a payment made from a second device. The communication device can store, in the memory element, a record of the payment. And the communication device can transmit, via the vending machine interface, an instruction to the vending machine to dispense an item associated with the payment.

In some implementations, the communication device can receive, via the wireless communication interface, a repair-needed notification from a second device. The communication device can store, in the memory element, the repair-needed notification. And the communication device can transmit, via the wireless communication interface, the repair-needed notification to the mobile computing device.

In some implementations, the communication device can establish, using the wireless communication interface, a connection to a second device. The communication device can transmit, via the wireless communication interface, the vending machine data to the second device. And the mobile computing device can receive, via the second wireless communication interface, the vending machine data over the computer network.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1A:
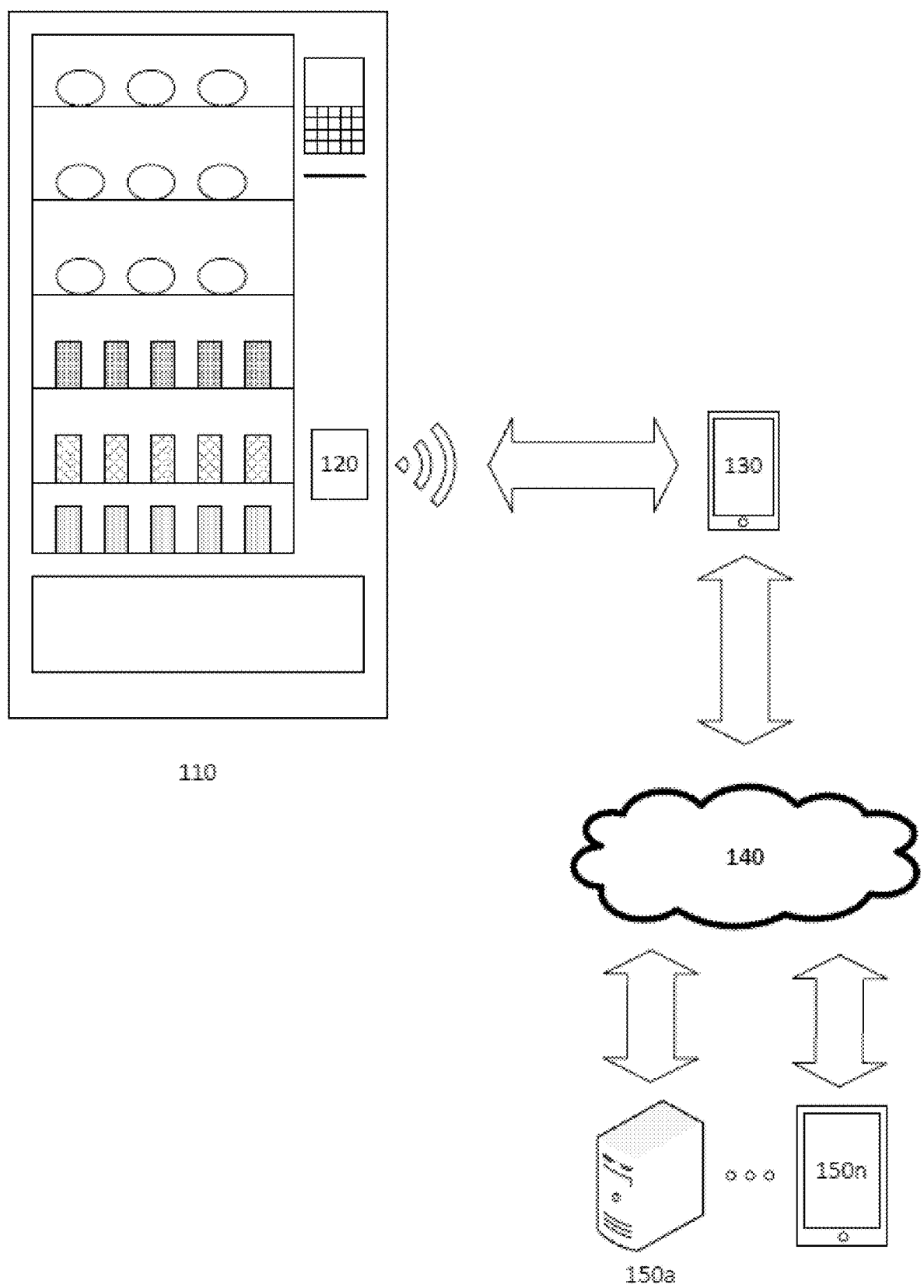
FIGS. 1A and 1B are overviews depicting implementations of a vending machine management system.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Following below are more detailed descriptions of various concepts related to, and implementations of, methods, apparatuses, and systems for interfacing with a vending machine. The various concepts introduced above and discussed in greater detail below may be implemented in any of numerous ways as the described concepts are not limited to any particular manner of implementation. Examples of specific implementations and applications are provided primarily for illustrative purposes.

An owner or operator of vending machines may employ one of several strategies to restock and otherwise maintain the vending machines. First, the operator may make two passes. Second, the operator may carry extra amount of every item.

For the first strategy, the operator may make two passes through each of the vending machines. In the first pass, the operator may note the amount of items missing in each of the plurality of vending machines. In the second pass, the operator may go back (e.g. to a storage vehicle or warehouse) and retrieve the exact aggregate number of items that are needed in all of the plurality of vending machines.

There are several drawbacks to the first strategy. First, the vending machines may be far apart from one another such that traveling between the vending machines may add significant additional time required to restock and/or service the vending machines. Second, opening and closing a vending machine may take significant amount of time, and making two passes may require additional time to open and close each vending machine.

For the second strategy, the operator may carry large amounts of every item that are provided in any of the plurality of vending machines. The advantage of the second strategy over the first strategy is that the operator may potentially only have to make a single pass through all of the vending machines, thus reducing the amount of time traveling between the vending machines and also opening and closing the vending machines.

There are, however, several drawbacks to the second strategy. First, carrying large amounts of every item may require a lot of work for the operator, particularly because the vending machines may store many different types of items. Carrying a lot of items also means that the operator will likely travel slower compared to carrying less amount of items. Second, the operator may still need to make a second pass to all or some of the vending machines, as carrying a large amount of items does not guarantee that all items will be restocked. In order to make the second pass, the operator may need to rearrange the inventory (e.g. in the warehouse) in order to access the items that are needed. Rearranging the inventory may take additional time and work that would not have been necessary if the operator knew the number of items necessary beforehand.

The two strategies described above can be improved upon. The operator would work more efficiently if he could make a single trip and carry only the items that were required for each vending machine. If kits can be prepared in response to reports, inventory may be reduced (both within the vending machine and at the warehouse) and items in a vending machine would run out less often.

The present application is directed to systems and methods for transmitting inventory data information wirelessly via a battery-powered device. Each vending machine may connect to a reporting device. The reporting device may communicate with a mobile device wirelessly, where the mobile device may be carried by an operator. The mobile device may communicate with a data network and directly communicate with a server and/or a control center.

At least one aspect of the present disclosure is directed to a system for a reporting device in a vending machine. The reporting device may wirelessly communicate a report to a mobile device. The reporting device may be powered by a battery, the vending machine, or an external power source. The reporting device may wake up periodically and search for a mobile device. If the reporting device finds a mobile device that is executing a reporting application, the reporting device may connect with the mobile device. The reporting device may transmit an inventory report to the mobile device. After the transmission, the reporting device may sleep for a predetermined period of time. The reporting device may then repeat this process.

FIG. 1A is and overview depicting implementations of a vending machine management system. The system may include a vending machine 110, a reporting device 120, and a mobile device 130. The system may also include a network 140 and one or more remote devices 150a-150n (generally referred to as remote device 150).

The vending machine 110 may store and display a plurality of items for purchase. The vending machine 110 may comprise an interface by which a user may select and pay for a stored item. The vending machine 110 may be restocked or serviced by an operator. The vending machine may comprise a reporting device 120. The vending machine 110 is described in greater detail in relation to FIG. 2.

The reporting device 120 may be within or attached to the vending machine 110. The reporting device 120 may be capable of communicating with the vending machine 110 via a communication interface. The reporting device 120 may also be capable of communicating with a mobile device 130. The reporting device 120 may generate an inventory report via communicating with the vending machine 110. The reporting device 120 may then provide the inventory report to the mobile device 130. The reporting device 120 can provide the inventory report to the mobile device 130 via a direct wireless connection such as WiFi, near field communication (NFC), Bluetooth Low Energy (BLE) or the like. The reporting device can be ruggedized to protect it from shipping damage and from the internal environment of the vending machine 110; e.g., dust, extreme temperatures, and leaking or exploding beverages. The reporting device 120 is described in greater detail in relation to FIG. 3.

The mobile device 130 may be a smartphone, a wearable device, a tablet, a personal digital assistant, a laptop, a handheld device, or any other computing device as described below in relation to a remote device 150. A vending machine operator may carry the mobile device 130. In some embodiments, an operator may approach the vending machine 110 and the reporting device 120. A wireless or a wired connection may be established between the reporting device 120 and the mobile device 130. The mobile device 130 may receive a vending machine inventory report. The mobile device 130 can receive the vending machine inventory report from the reporting device 120 regardless of whether the mobile device 130 is connected to the network 140. In some embodiments, the mobile device 130 may perform additional analysis from the vending machine inventory report. In some embodiments, the mobile device 130 may upload the vending machine inventory report via a network 140 connection. If the mobile device 130 is not connected to the network 140 at the time it receives the vending machine inventory report from the reporting device 120, it can store the vending machine inventory report in its memory until a connection to the network 140 is reestablished. The mobile device 130 is described in further detail in relation to FIG. 4.

The network 140 may include a local area network (LAN), a wide area network (WAN), a wireless link, an intranet, the Internet, or combinations thereof. The mobile device 130 and the remote device 150 may connect to the network 140. In some embodiments, the reporting device 120 may also connect to the network 140.

A remote device 150 connected to a network 140 may store or view the vending machine inventory report. The remote device 150 may be a computer, a laptop, a desktop, a smartphone, a wearable device, a tablet, a personal digital assistant, a set-top box, a smart television, a server device, a gaming console, a server, or any other computing device. The remote device 150 may include a data processor and a memory. The data processor may include a microprocessor, an application-specific integrated circuit (ASIC), a field-programmable gate array (FPGA), a micro controller, a system-on-a-chip, or combinations thereof. The memory may include, but is not limited to, electronic, integrate circuit assemblies, optical, magnetic, or any other storage or transmission device capable of providing processor with program instructions. The memory may store data and instructions. When executed by a processor, an instruction may cause the processor to perform one or more operations. The remote device 150 may execute operating systems, software applications, browser, and other applications. The remote device 150 may include input and output interfaces and devices. Input devices include a keyboard, mouse, touchscreen, microphone, gyroscope, etc. Output device include a monitor, display, screen, speaker, haptic device, etc. The remote device 150 may connect to the network 140 via a wireless or a wired interface. Wireless interface may include Bluetooth, near-field communication, WiFi, optical scanner, radio, etc.

Figure 1B:
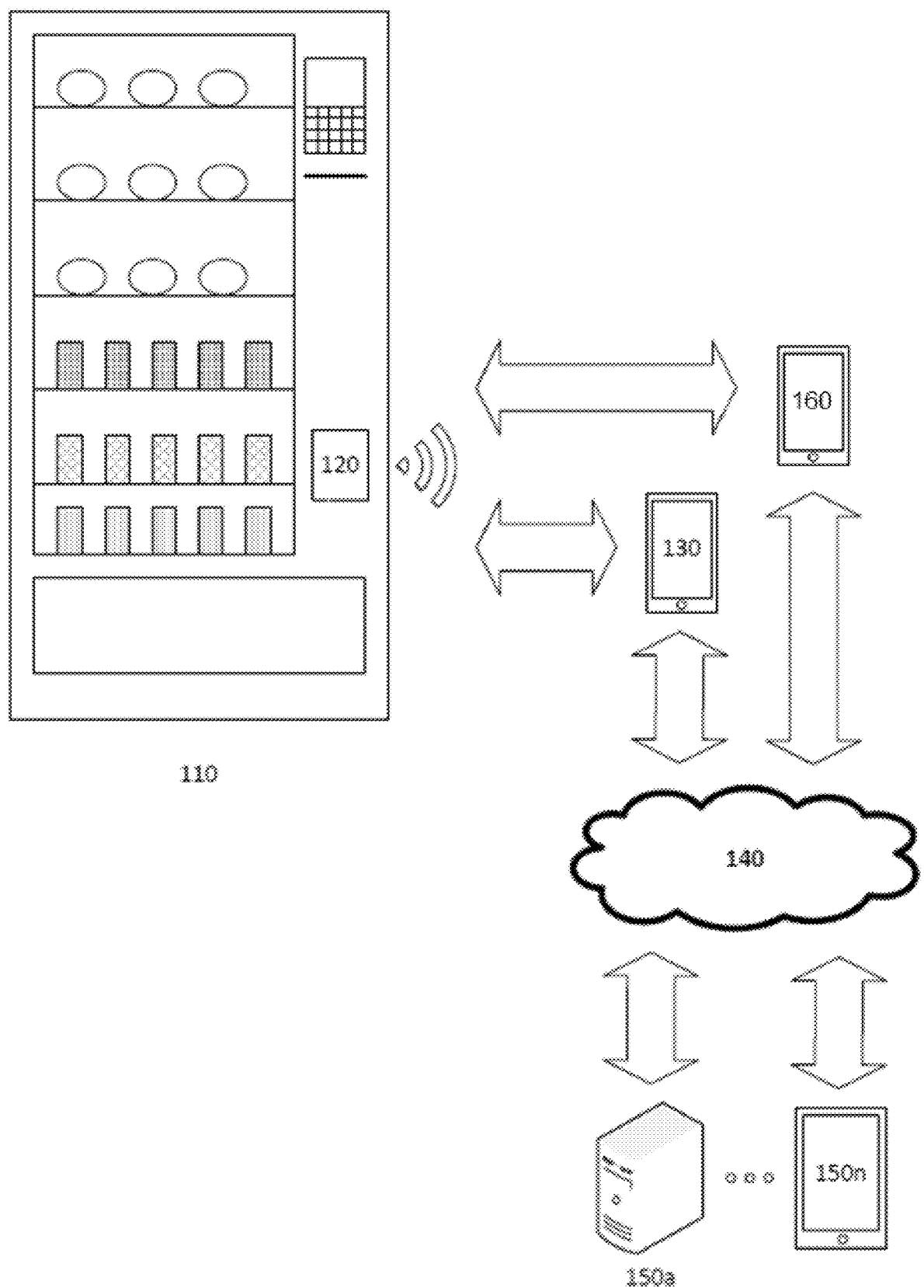

FIG. 1B is and overview depicting implementations of a vending machine management system. The system may include a vending machine 110, a reporting device 120, and mobile devices 130 and 160. The system may also include a network 140 and one or more remote devices 150a-150n (generally referred to as remote device 150).

In FIG. 1B, an additional mobile device 160 can interface with the reporting device 120. The mobile device 160 may be a smartphone, a wearable device, a tablet, a personal digital assistant, a laptop, a handheld device, or any other computing device as described above in relation to a mobile device 130. The mobile device 160 may be carried by a customer or prospective customer of the vending machine as opposed to a vending machine operator. In some embodiments, a customer may approach the vending machine 110 and the reporting device 120. A wireless or a wired connection may be established between the reporting device 120 and the mobile device 160. The mobile device 160 may receive a vending machine inventory report. In some embodiments, the mobile device 160 may prompt the customer for permission to upload the vending machine inventory report via a network 140 connection. In some embodiments, the mobile device 160 may upload the vending machine inventory report via a network 140 connection if the customer grants such permission. In some embodiments, the customer may be offered a reward or promotional offer for uploading the vending machine inventory report. In some embodiments, the customer may make purchases from the vending machine 110 using the mobile device 160. In some embodiments, the customer may send repair-needed notifications using the mobile device 160. The repair needed notifications can be sent to the reporting device 120, or to a remote device 150. The mobile device 160 is described in further detail in relation to the mobile device 130 of FIG. 4.

Figure 2:
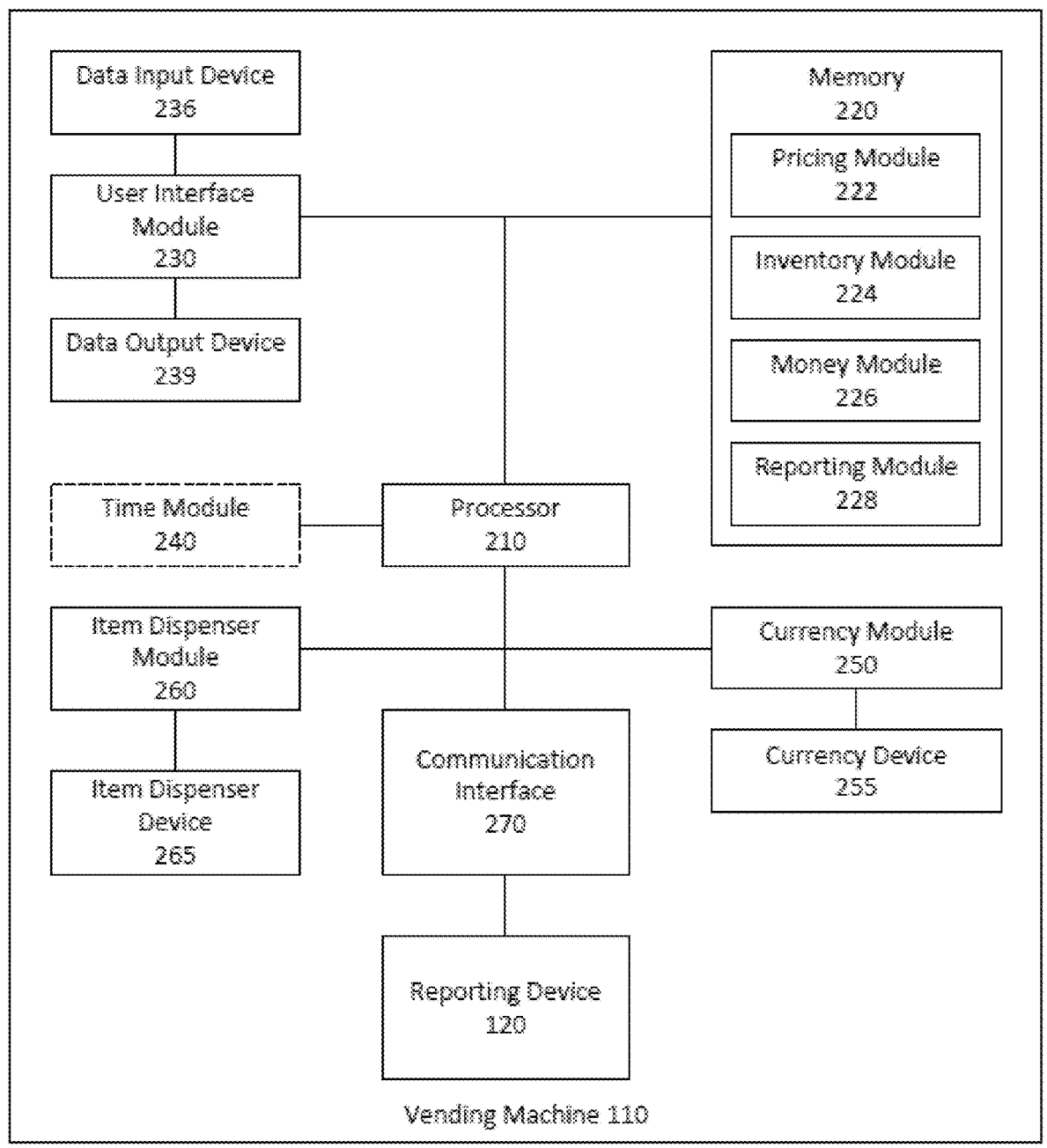
FIG. 2 is a block diagram depicting a general architecture of a vending machine.

FIG. 2 is a block diagram depicting a general architecture of a vending machine. In brief overview, the vending machine 110 may include a processor 210, memory 220, user interface module 230, data input device 236, data output device 239, time module 240, currency module 250, currency device 255, item dispenser module 260, item dispenser device 265, communication interface 270, and the reporting device 120.

Still referring to FIG. 2, and in more detail, the processor 210 may be a processor may include a microprocessor, an application-specific integrated circuit (ASIC), a field-programmable gate array (FPGA), a micro controller, a system-on-a-chip, or combinations thereof. The processor 210 may be designed or programmed to operate, maintain, service, log the vending machine 110. The processor 210 may execute instructions stored on memory 220. The processor 210 may also read or write data on memory 220. In some embodiments, the processor 210 and the memory 220 are in a single module or chip. In some embodiments, the processor 210 may be referred to as a vending machine controller (VMC). In some embodiments, the processor 210 and the modules may be referred to as the VMC.

Memory 220 may be one or more memory chips capable of storing data and allowing any storage location to be directly accessed by the processor 210, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). Memory 220 may also be read-only memory (ROM), such as Mask ROM, Programmable ROM, erasable programmable ROM, or Electrically Erasable Programmable ROM. Memory 220 may store instructions, firmware, inventory reports, pricing, and other data that may be stored or recorded for the operation of the vending machine 110.

In some embodiments, the memory 220 may comprise a pricing module 222, an inventory module 224, a money module 226, and a reporting module 228. In some embodiments, one or more of these modules may be implemented in the processor 210 or another module. In some embodiments, the memory 220 may comprise additional modules such as the user interface module 230, the time module 240, the currency module 250, item dispenser module 260, and the communication interface 270.

The pricing module 222 may comprise a planography of all the items available in the vending machine 110. The pricing module 222 may further include location of each within the vending machine 110. Location of an item provided by a vending machine 110 may be determined by row, shelf, and index number. In some embodiments, the location of an item provided by a vending machine 110 may be determined by key presses that are to be pressed by a user to select the item. In some embodiments, a location may be identified by an alphanumeric sequence, e.g. D1. The pricing module 222 may store a corresponding price for each item. The pricing module 222 may be a table storing a location of each item and an item identifier. The item identifier may be a name, a brand, a description, etc. of an item. The pricing module 222 may comprise a table that stores the location and item identifier of each item.

The inventory module 224 may store the total number of inventory stored within the vending machine 110. The inventory module 224 may store, for instance, a location of an item and a corresponding amount of the item. The inventory module 224 may be stored as a table or combined with the pricing module. The inventory module 224 may store a time when an item was selected. The inventory module 224 may store a plurality of times when items were selected as a list of purchase events. A purchase event may be a transaction initiated by a user of the vending machine 110. The inventory module 224 may also store a total number of items that may be stored for each item. For instance, the vending machine 110 may have capacity to store ten items in a particular location, e.g. D1.

The money module 226 may store a total amount of money stored in the vending machine 110. The money module 226 may track each number of each denomination of cash, e.g. paper bills and coins. In some embodiments, the money module 226 may interface with the currency module 250. The money module 226 may also store a list of purchase events. The money module 226 may store a total amount of cash in the vending machine 110. The money module 226 may store a total amount of purchases made on the vending machine 110.

The reporting module 228 may store one or more instructions that combine the data in the pricing module 222, inventory module 224, and the money module 226 and send the combined data as a report via a communication interface 270. In some embodiments, the reporting module 228 may be implemented on the processor 210 or the communication interface 270. In some embodiments, the reporting module 228 may comprise a list of data pointers, each of which may point to data that may be part of a report.

In some embodiments, the inventory module 224, the money module 226, and the reporting module 228 may be a single module. In some embodiments, the inventory module 224, the money module 226, and the reporting module 228 may store a report in memory 220. The report may be stored in the memory 220 as American Standard Code for Information Interchange (ASCII) characters. The report may be a digital exchange (DEX) file, e.g. store data in a DEX protocol.

The user interface module 230 may comprise a user interface via which a user may select and initiate a transaction of one of the items stored in the vending machine 110. In some embodiments, the user interface module may be stored in memory 220. The user interface module 230 may communicate with the processor. In some embodiments, the user interface may use a multi drop bus (MDB) to interface with the processor 210 or any other modules in memory 220 or otherwise. For instance, the user interface module 230 may communicate via the MDB with the pricing module 222, inventory module 224, money module 226, reporting module 228, item dispenser module 260, communication interface 270, or the currency module 250. The user interface module 230 may be connected to and communicate with a data input device 236 and a data output device 239. The user interface module 230 may allow a user or an operator to select an item via the data input device 236. The user interface module 230 may output various information via the data output device 239.

The data input device 236 may allow a user or an operator to select an item. In some embodiments, the data input device 236 may comprise a plurality of buttons. The data input device 236 may be used to select an item via a location. In some embodiments, location may be an alphanumeric sequence, a name of an item, a characteristic of an item, etc. In some embodiments, the data input device 236 may include a touch screen. In some embodiments, the data input device 236 may include a plurality of buttons, each button labeled with a picture or a logo of an item. In some embodiments, the data input device 236 may be used by an operator to select one or more items and perform service functionality to the vending machine 110, such as re-pricing items.

The data output device 239 may display or output data to a user or an operator. In some embodiments, the data output device 239 may display a name, location, description, etc. of a selected item. In some embodiments, the data output device 239 may display a pricing information of an item. In some embodiments, the data output device 239 may display that a reporting device 120 has detected or connected to a mobile device.

The time module 240 may indicate a present time. In some implementations, the time module 240 may be part of the processor 210. The time module 240 may be used by one or more modules and the reporting device 120. Any events, such as a user transaction or an operator opening the vending machine 110, may be recorded with a timestamp from the time module 240.

The currency module 250 may interface with the processor 210 and other modules to accept money from a user. In some embodiments, the currency module 250 may be included in memory 220. The currency module 250 may be connected via a MDB or any other interface. The currency module 250 may interface with one or more currency devices 255. Different currency device 255 may be capable of accepting a form of currency. For instance, a currency device 255 may be operable to accept coins and/or cash. The currency module 250 may communicate with the inventory module 224 and/or the processor 210 to find a pricing of an item. The currency module 250 may calculate and output money when a user puts in excess amounts of money during a transaction. The currency module 250 may include, for instance, a coin mech, bill validator, coin boxes, etc.

The item dispenser module 260 may interface with the processor 210 and other modules to dispense a selected item during a transaction. The item dispenser module 260 may be part of memory 220. The item dispenser module 260 may be connected via MDB or any other interface. The item dispenser module 260 may communicate with an item dispenser device 265. The item dispenser device 265 may comprise any mechanical means of producing, vending, or in out ways supplying a selected item.

The communication interface 270 may interface with the processor 210 and/or other modules to communicate with the reporting device 120. The communication interface 270 may be any serial or parallel interface. In some embodiments, the communication interface 270 may be a DEX port. In some embodiments, the communication interface may be a MDB. The communication interface 270 may comprise, for instance, a quarter-inch phone connector jack. In some embodiments, the communication interface 270 may be a female jack. The jack may be on a same board as the processor and/or the VMC or may be found at the end of a flexible extension cable. The pin-out of the jack may include transmit, receive, and ground. The pin-out may be labeled, respectively, as tip, ring, and sleeve. The communication interface 270 may allow a connection to any other modules in the vending machine 110. For instance, the communication interface 270 allows a reporting device 120 to connect with, communicate with, or read from the reporting module 228. In some embodiments, reporting device 120 may perform a handshake procedure with the VMC via the communication interface 270. For instance, the reporting device 120 may send a request to the VMC and receive a response from the VMC. After receiving the response, the reporting device 120 may send a confirmation to the VMC.

In embodiments where the communication interface 270 is a DEX port, the DEX port may transmit and receive signals at a predefined voltage levels. In some embodiments, the DEX port may transmit and receive signals at either RS-232C bipolar voltage levels, on Transistor-to-transistor logic (TTL) unipolar voltage levels, or on National Instruments VISA voltage levels.

Data may be transmitted or received via the communication interface 270 in different ways. Data may be a report, stored in memory 220 as ASCII characters. In some embodiments, the data transmission may be structured as an asynchronous half-duplex serial interface. In some embodiments, the data transmission may be synchronous. In some embodiments, the data transmission may be full duplex. In some embodiments, the data transmission may be a parallel interface. The communication interface 270 may be characterized by or communicate in a baud rate. In some embodiments, the communication interface may have a baud rate of 9600 bits/s. In some embodiments, the baud rate may be between 10 to 250000 bits/s. For instance, the baud rate may be 300 bits/s, 1200 bits/s, 2400 bits/s, 4800 bit/s, 14400 bits/s, 19200 bits/s, 28800 bits/s, etc. The data transmission may be characterized by eight-bit bytes. In some embodiments, the data transmission may use other size bytes, for instance seven-bit, nine-bit, or ten-bit bytes. In some embodiments, the data transmission may not include a parity bit for each byte. In other embodiments, the data transmission may include a parity bit for each byte. In some embodiments, each byte may encode a character. For instance, each byte may encode a seven-bit ASCII character. In some embodiments, each byte may include a stop bit. In some embodiments, no flow control is used. In some embodiments, hardware flow control may be used, such as: Request To Send (RTS) and Clear To Send (CTS) in RTS flow control; or Data Terminal Ready (DTR) and Data Set Ready (DSR) in DTR flow control. In some embodiments, software flow controls may be used. In some embodiments, open-loop flow control or closed-loop flow control may be used.

The VMC, via the reporting module 228 or any other module or the processor 110, transmit data via the communication interface 270. The data transmitted may be a DEX file. A DEX file may be an ASCII code-based electronic audit file. A DEX file may include information on sales/transactions, amount of cash of each denomination in each currency device 255, when the vending machine 110 has been opened, pricing, layout, and any other information regarding the operation of the vending machine 110. The DEX format may be created by the reporting module 228 or by one or more modules via the processor 210.

The VMC may transmit a data file in blocks, also referred to as data blocks. In some embodiments, the VMC may transmit a DEX file in blocks. The blocks may have a maximum size. In some embodiments, a block may have a maximum size of 245 bytes. In other embodiments, the maximum size of a block may range from 8 bytes to 1048576 bytes.

A data block may include one or more control characters. In some embodiments, the start of a data block may be designated by a "Start transmission" command. For instance, the start transmission command may be a data link escape (DLE) character of start text character (STX). In some embodiments, the end of a data block may be designated by a "End transmission" command. For instance, the end transmission command may be a DLE character of End of text character (ETX). In some embodiments, a block may further comprise additional control characters, such as start of header (SOH) and End of transmission block (ETB) character.

In some embodiments, error-detecting code may be used to detect any changes to raw data. In some embodiments, after all blocks have been transmitted, a cyclic redundancy check (CRC) may be sent. The CRC may be any size. For instance, a 16-bit CRC (CRC-16) may be sent. In other instances, the CRC size may be between 1 bit to 64 bits. In some embodiments, other error detection schemes may be used, such as repetition codes, checksums, cryptographic hash functions, and error-correcting codes.

In an illustrative embodiment that uses a CRC-16, the CRC-16 may be transmitted as two 8-bit bytes, with the least significant byte sent first followed by the most significant byte second. The VMC may create the CRC-16 using an algorithm based on the beginning and ending of a transmission block. The reporting device 120 must use the same algorithm to each incoming block to ensure proper translation. In some embodiments, CRC-16 may be used to check across all systems.

Figure 3:
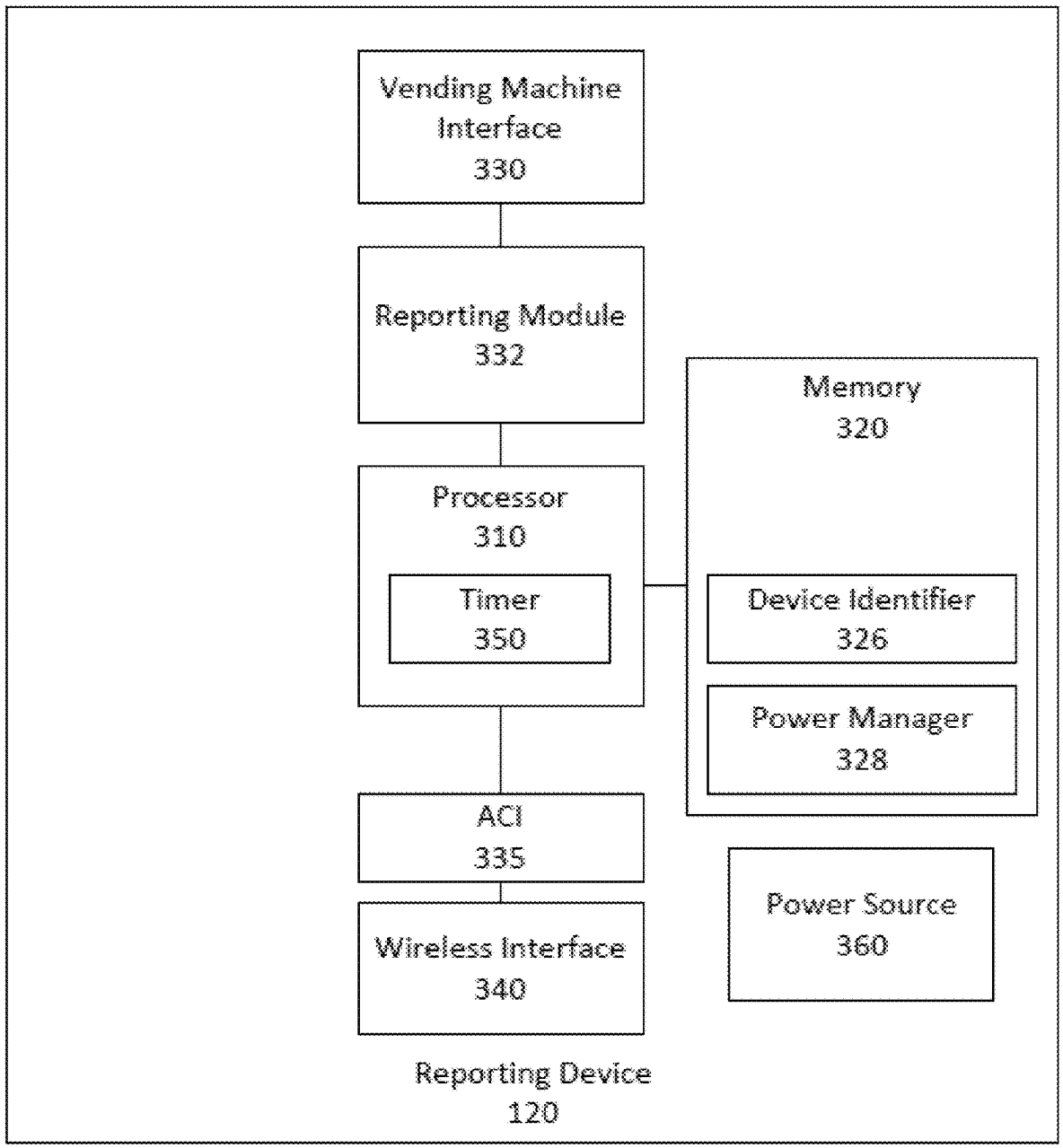
FIG. 3 is a block diagram depicting a general architecture for a reporting device that may be employed to implement various elements of the systems and methods described and illustrated herein.

FIG. 3 is a block diagram depicting a general architecture for a reporting device 120 that may be employed to implement various elements of the systems and methods described and illustrated herein. In brief overview, the reporting device 120 may comprise a processor 310, memory 320, vending machine interface 330, a reporting module 332, an application controller interface 335 (ACI), and a wireless communication interface 340. The reporting device 120 may also include a power source 360.

Still referring to FIG. 3, and in greater detail, the processor 310 may be any microcontroller or microprocessor, as described in relation to the processor 210 of FIG. 2. In some embodiments, the processor 310 may be a microcontroller unit (MCU). In some embodiments, the processor 310 may be made by Texas Instruments Inc., located in Dallas, Tex. In some embodiments, the processor 310 may be an ARM® CORTEX-MO CPU by ARM Ltd., located in Cambridge, United Kingdom. The processor 310 may perform any checks, e.g. CRC-16, on the incoming data from the vending machine interface 330. In some embodiments, the processor 310 may include a timer 350. The timer 350 may be used by the processor 310 or the memory 320. The time 350 may be used to wake the reporting device 120 at a specified interval 120. The timer 350 may be used to find a current time to write a time stamp on an event or a report. In some embodiments, the processor 310 may include one or more of the other components of the reporting device 120. For instance, the processor 310 may be a single chip that includes or incorporates the memory 320, the reporting module 332, the ACI 335, the wireless interface 340, the report generator 324, the power manager 328, and/or the vending machine interface 330. For instance, a processor 310 that is a MCU may incorporate a wireless interface 340 with the processor 310.

In some embodiments, the processor 310 may be programmed. In some embodiments, instructions which can be executed by the processor 310 may be stored in the memory 320. In some embodiments, the processor 310 may be programmed over the ACI 335, or another interface. In some embodiments, processor 310 may be programmed over universal asynchronous receiver/transmitter (UART) pins. In some embodiments, no flow control is used to program over the UART pins. In some embodiments, the processor 310 may be programmed to different module settings. In some embodiments, the processor 310 may be programmed using Hayes modem commands, such as a modem's attention commands (AT commands).

The memory 320 may be any memory as describe in relation to the memory 220 of FIG. 2. The memory may include a device identifier 326 and a power manager 328. In some embodiments, the reporting module 332, the timer 350, or the ACI 335 may be stored within the memory 320 as executable instructions. The device identifier 326 may be an alphanumeric string that uniquely identifies the reporting device 120. In some embodiments, the device identifier 326 may be appended with a location information of the vending machine 110, the owner of the reporting device 120, and any other information regarding the vending machine 110 and the reporting device 120.

The power manager 328 may interface with the processor 310 and/or the timer 350. In some embodiments, the power manager 328 may be outside the memory 320 and connected to the processor 310. The power manager 328 may place the reporting device 120 in a sleep mode. After a predefined amount of time, which may be defined in memory, the power manager may wake up the reporting device 120, including the ACI 335 and the wireless communication interface 340. If the wireless communication interface 340 does not find any mobile device 130 to connect to, the power manager 328 may place the reporting device 120 back to sleep for the predefined amount of time. In this manner, the energy consumption of the reporting device 120 can be low, allowing it to run on a limited power source for months or years without a dedicated power connection or frequent maintenance.

The vending machine interface 330 may comprise an interface by which the reporting module 332 communicates with the VMC via the communication interface 270 of FIG. 2. The vending machine interface 330 may operate at a voltage level that the communication interface 270 uses. The vending machine interface 330 may be connected to the communication interface 270 via a wired connection. The vending machine interface 330 may be connected to and controlled by a reporting module 332.

The reporting module 332 may connect the vending machine interface 330 to the processor 310. The reporting module 332 may communicate the data from the vending machine interface 330 to the processor 310. The reporting module 332 may control the vending machine interface 330. In some embodiments, the reporting module 332 may be a DEX reporting module. In some embodiments, the vending machine interface 330 and the reporting module 332 may collectively be referred to as the reporting module 332. In some embodiments, the reporting module 332 may append received report from the VMC with a device identifier 326 and a time from the timer 350. In some embodiments, the report generator 324 may interface with a plurality of modules within the VMC and create a report file, e.g. a DEX file.

In some embodiments, the reporting module 332 and/or the vending machine interface 330 may perform voltage level detection. For instance, the reporting module 332 may identify a voltage level of a communication interface 270, e.g. a DEX port. The reporting module 332 may then determine whether a voltage level shifting is necessary. For instance, if the voltage levels on the vending machine interface 330 is not within the predefined voltage levels, then voltage level shifting is necessary. In some embodiments, if voltage level shifting is necessary, the reporting module 332 and/or the vending machine interface 330 may perform voltage level shifting. In some embodiments, the vending machine interface 330 may operate at either the RS-232C bipolar or TTL unipolar standards. For instance, for the RS-232C standard, a threshold of +3 to +25 volts represents a logical 0, while −3 to −25 volts represents a logical 1. Given the variance of the output from a machine, the incoming signal voltage may be regulated for the vending machine interface 330. In some embodiments, to interface with VMCs that are integrated circuits (ICs), the incoming signal voltage may be regulated to TTL unipolar voltage levels compatible with the processor 310 which communicates with the wireless communication interface 340. In some embodiments, voltage from the communication interface 270 will be boosted. For instance, if the signal is at TTL levels coming from an IC, the signal may be boosted to corresponding RS-232C level. In some embodiments, the reporting module 332 and/or the vending machine interface 330 may include a driver or a receiver to boost or shift voltages. For instance, a RS-232 driver and/or receiver may boost or shift voltages, and bridge the RS-232C and TTL voltage levels while maintaining proper current.

The ACI 335 may be used by the processor 310 to communicate via the wireless interface 340. In some embodiments, the ACI may function as a serial peripheral interface (SPI). In some embodiments, the ACI may assert the processor 310 or the ACI as a master and the wireless interface 350 may be a slave. For instance, in embodiments in which the wireless interface 350 is a BLE module, the BLE module may be a slave. In some embodiments, the ACI 335 and the wireless communication interface 340 may share a synchronized clock. In some embodiments, the shared clock may be the timer 350. In some embodiments, communication between the ACI 335 and the communication interface 340 may occur over one or more ports. In some embodiments, a port may be a Master-In, Slave-Out (MISO) port. In some embodiments, a port may be a Master-Out, Slave-In (MOSI) port. In some embodiments, the processor 310 may send the controller a handshake request over the ACI to the wireless interface 340, e.g. a Bluetooth module, to activate it and prepare it for communications. In some embodiments, the wireless interface 350 may be activated and return a "ready" signal to the processor 310 over the ACI 335. After receiving a "ready" signal, the processor 310 and the wireless interface 340 may begin communication. The processor 310 may regulate the flow of the data coming from the vending machine interface 330, e.g. the DEX reporting module. The processor 310 may also send packets to the wireless interface 340 for it to transmit to a mobile device.

In some embodiments, the ACI 335 may be connected to the wireless interface 340 via one or more General-purpose input/output (GIPO) pins. In some embodiments, the ACI 335 may be connected to the wireless interface 340 via between one to sixteen GIPO pins. In some embodiments, there may be two GIPO pins. In some embodiments, the GIPO pins may be configured for receiving and transmitting data to and from the processor 310 and/or the vending machine interface 330, where the data may be from the vending machine 110. In some embodiments, the ACI 335 may connect to the wireless interface 340 via UART, 3-wire UART, USB, or secure digital input output (SDIO).

In some embodiments, when data is communicated to the wireless interface 340, the processor 310 may break or combine the blocks, e.g. transmission blocks, coming from the vending machine interface 330 and/or the reporting module 332, into packets that may be sent over the ACI to wireless interface 340. The processor 310 may determine how to break or combine the blocks based on the number of bytes in a block that are attempting to be transmitted by the reporting module 332. In some embodiments, one or more blocks may be stored temporarily in a memory buffer before a connection over the wireless interface 340 is established, and once the connection is established, the one or more blocks in the memory buffer may be sent over the wireless interface 340.

The wireless interface 340 may be a Bluetooth interface, a WiFi interface, a near-field communication (NFC) interface, an infrared interface, or any other wireless interface 340 that may be used to communicate with a mobile device 130. In some embodiments, the wireless communication interface 340 may be a cellular data interface, such as GSM, UMTS, or LTE frequency bands, or UMTS, HSDPA, HSUPA, HSPA+, CDMA, LTE, or WiMAX networks. In some embodiments, the wireless communication interface 340 may be a ultra-narrow band (UNB) interface. In some embodiments, the wireless communication interface 340 may allow the reporting device 120 to communicate directly with a cellular tower, a network tower, a satellite, or a control server. In some embodiments, the wireless interface 340 may be a Bluetooth Low Energy (BLE) module.

In some embodiments, the wireless interface 340, e.g. the BLE module, may connect directly to the reporting module 332. The wireless interface 340 may be configured to operate as a peripheral device. In some embodiments, the wireless interface 340 may connect to the reporting module 332, e.g. the DEX reporting module. In some embodiments, the wireless interface 340 may be a host and transmit to a mobile device 130 which includes its own wireless interface 340 that acts as a client. In some embodiments, the wireless interface 340 may setup this communication channel with the mobile device 130 with security features. In some embodiments, the processor 310 may send commands to the wireless interface 340 via the ACI 335 or any corresponding controller, e.g. BLE module controller. The wireless interface 340 may be toggled between active mode and sleep mode by the power manager 328 and/or the processor 310. The processor 310 may send a command to the wireless interface 340 to sleep or to wake up to active mode. Once the wireless interface 340 is awoken, it may broadcast its address for a fixed amount of time. Afterwards, the processor 310 may send a sleep command to put the reporting device 120 back into sleep mode.

The power source 360 may be a battery, a coin cell battery, or any other power source. In some embodiments, the reporting device 120 may be trickled charged via the vending machine interface 330 and not require a separate power source. Harvesting power in this manner can further reduce the maintenance requirements of the reporting device 120 by obviating the need for periodic battery changes. In some embodiments, the power source may be another connection to the vending machine 110. In some embodiments where the power source 360 is a cell battery, the cell battery may be a 230 mAh coin cell battery. In some embodiments, different capacity, size, form of batteries may be used.

Figure 4:
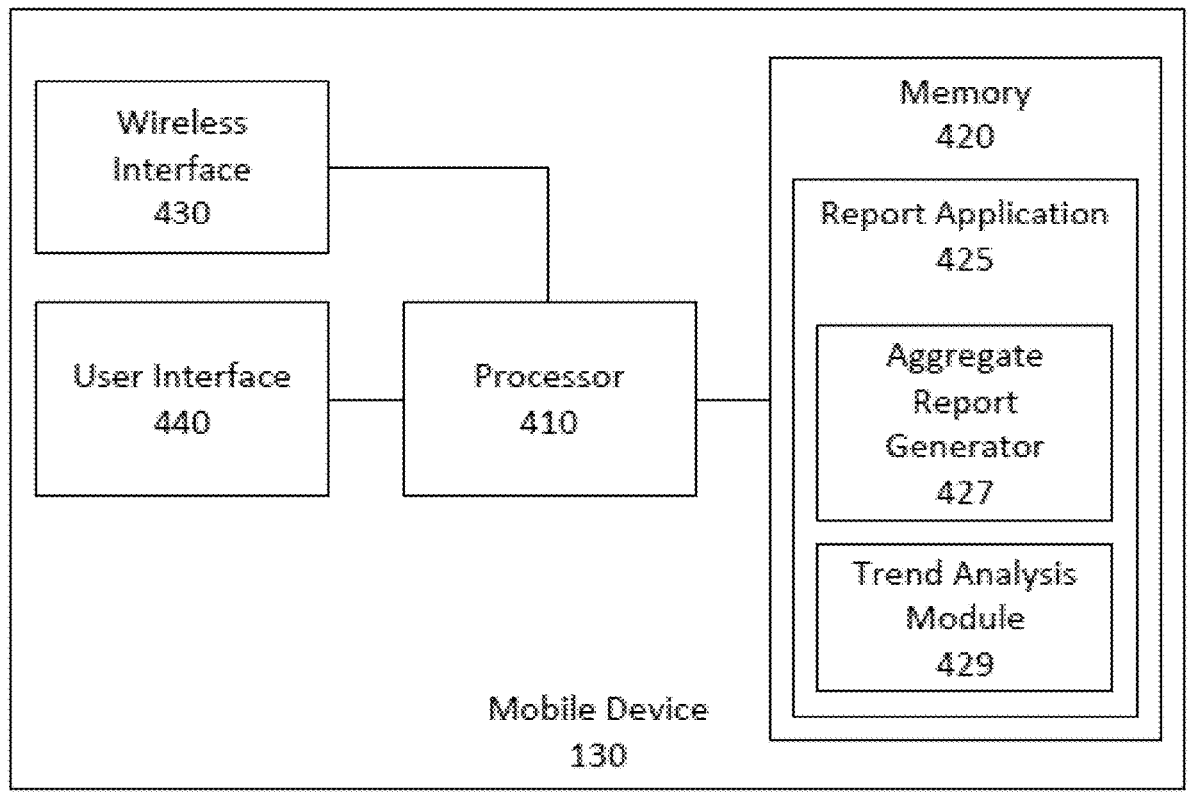
FIG. 4 is a block diagram depicting a general architecture of a mobile device that may be employed with the reporting device of FIG. 3.

FIG. 4 is a block diagram depicting a general architecture of a mobile device 130 that may be employed with the reporting device of FIG. 3. In brief overview, the mobile device 130 may include a processor 410, memory 420, wireless interface 430 and user interface 440. The mobile device 130 may be a laptop, tablet computer, smart phone, wearable computer, smart vehicle, personal digital assistant, or any other such device.

Still referring to FIG. 4, and in greater detail, the processor 410 may be similar to the processor 310 as described in relation to FIG. 3, and the processor 210 as described in relation to FIG. 2. In some embodiments, the processor 410 may be a microprocessor or a processor based on a family of instruction set architectures such as ARM, Power Architecture, SPARC, MIPS, AVR32, and x86 architectures. In some embodiments, the processor 410 may be part of a SoC.

Memory 420 may be similar to memory 320 as described in relation to FIG. 3 and memory 220 describe in relation to FIG. 2. In some embodiments, memory may include DRAM. Memory 420 may further include ROM and flash memory. Memory 420 may include report application 425, which may include an aggregate report generator 427 and/or a trend analysis module 429.

The report application 425 may communicate via the wireless interface 430 with the reporting device 120. The report application 425 may command the wireless interface 430 to connect with the wireless interface 340 of the reporting device 340. The aggregate report generator 427 that aggregates multiple reports from a plurality of vending machines 110. The trend analysis module 429 may analyze one or more reports from a single or multiple vending machines 110 to predict or estimate a number of each items that will be required to stock each vending machine 110.

The wireless interface 430 may be any wireless interface capable of communicating with the wireless interface 340 of the reporting device 120. In some embodiments, the wireless interface 430 may be a Bluetooth interface, BLE interface, WiFi interface, and/or any other interface that is used by the wireless interface 340 of the reporting device 120. In some embodiments, the mobile device 130 may include a plurality of wireless interfaces 430. For instance, the mobile device 130 may have BLE interface as well as a cellular network interface.

The user interface 440 may provide an operator using the mobile device 130 a way to view reports from the vending machine. The user interface 440 may be a touch screen, a keyboard and a mouse, or any other input and output interfaces. The user interface 440 may allow the user to set prices, find out which items have been sold, amount of cash withdrawn, examine the DEX report, etc.

Figure 5A:
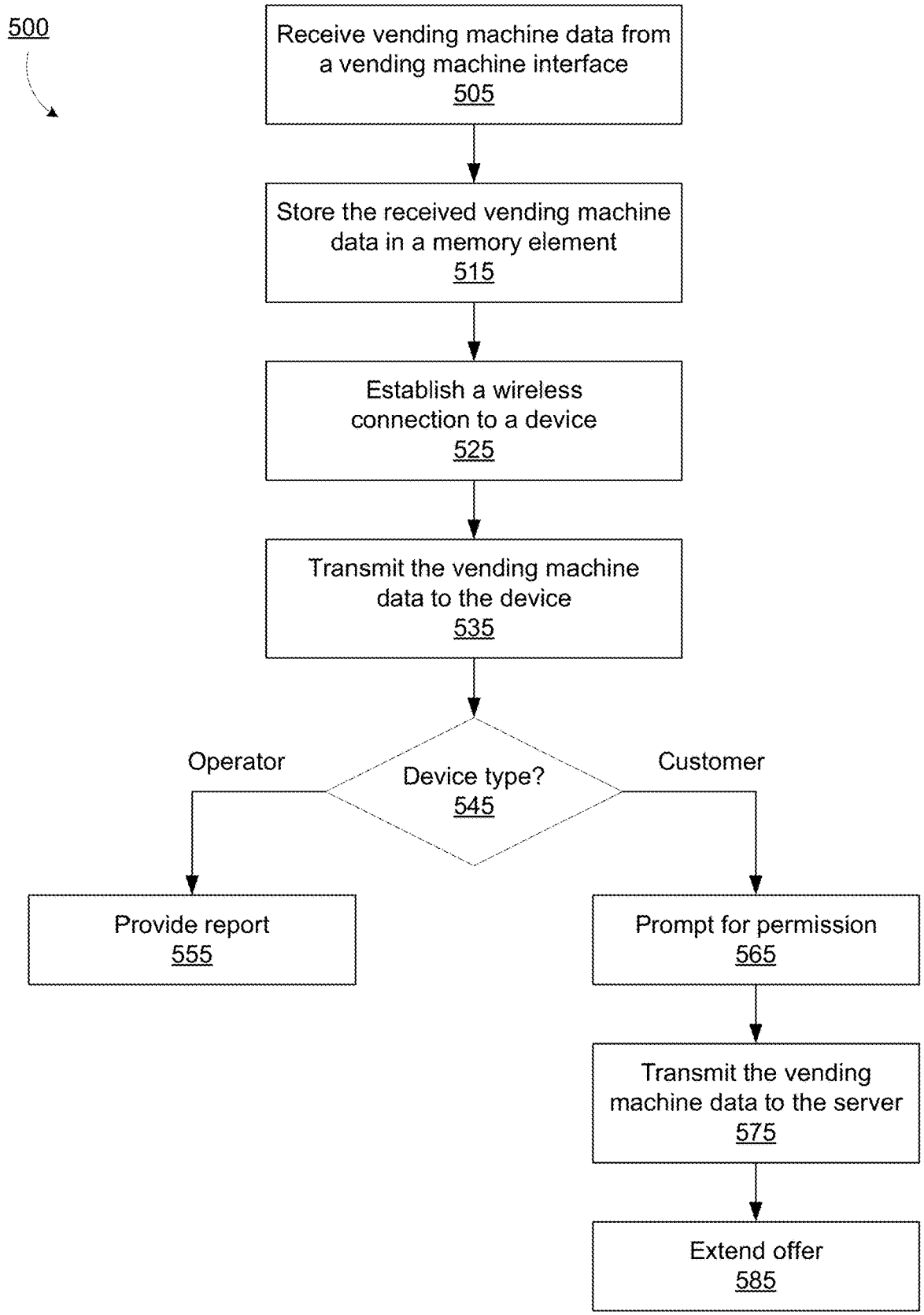
FIGS. 5A and 5B are flowcharts of embodiments of methods for transmitting a vending machine inventory report from a reporting device.

FIG. 5A is a flowchart of an embodiments of a method for transmitting a vending machine inventory report from a reporting device. In brief overview, the method 500 includes receiving vending machine data from a vending machine interface (step 505), storing the received vending machine data in a memory element (step 515), establishing a wireless connection to a device (step 525), and transmitting the vending machine data to the device (step 535). In some embodiments, the method can include detecting the type of connected device (step 545). If the device belongs to an operator, the method can include issuing one or more reports based on the vending machine data transmitted (step 555). If the device belongs to a customer, the method can include prompting the customer for permission to upload the vending machine data to the server (step 565), and uploading the vending machine data to the server if permission is given (step 575). In some embodiments, the method can include rewarding the user with a promotional offer or points in return for providing the vending machine data to the server (step 585).

Still referring to FIG. 5A, and in greater detail, the method includes receiving vending machine data from a vending machine interface 330 (step 505). The vending machine interface 330 may comprise an interface by which the reporting module 332 communicates with the VMC via the communication interface 270 of FIG. 2. In receiving the vending machine data, the vending machine interface 330 may detect a voltage level that the communication interface 270 uses for communication, and operate at that voltage. In some implementations the communication voltage may correspond to TTL logic levels. In some implementations the communication voltage may correspond to RS-232 standard voltage levels. The vending machine interface 330 may be connected to the communication interface 270 via a wired connection. The wired interface may include a ¼" stereo plug and jack. The processor 310 receives the vending machine data from the vending machine interface. In this manner, the vending machine interface 330 can buffer and convert the vending machine data received from the VMC to a format usable by the processor 310.

At step 515, the method includes storing the received vending machine data in a memory element 320. The processor 310 can send the vending machine data to the memory element 320 for storage until such time as the vending machine data can be uploaded to a mobile device 130 or 160.

At step 525, the method includes establishing a wireless connection to a device 130. The reporting device 120 can search for a nearby device via Bluetooth, BLE, WiFi, NFC, or some other appropriate wireless connection. In some implementations, particularly in implementations where the reporting device 120 is battery powered or runs on some other limited power source, the method may include periodically waking up from a sleep mode and searching for a nearby device requesting a connection. Such steps are described in detail below with regard to FIG. 5B. In other implementations, the reporting device may remain in a mode of normal operation while periodically searching for nearby mobile device 130 or 160, or remaining available to requests for a wireless connection from a mobile device 130 or 160.

At step 535, the method includes transmitting the vending machine data to the device 130. If a connection is successfully established in step 525, the method includes transferring one or more files to the nearby device with which a connection was established. In some embodiments, one or more files are transferred from the memory 320 of the reporting device 120. In some embodiments, the one or more files are DEX files or data blocks. In some embodiments, the files and/or data blocks can include information such as vending machine identity information, vending machine model information, cash collected, cash on hand, vend counts for all selections, vend counts for individual selections, time and date information, and maintenance information. In some embodiments, the files are transferred from a temporary memory buffer. In some embodiments, the one or more files are from the reporting module 332 of the reporting device 120.

At step 545, the method can include detecting the type of connected device. This step may be performed after a wireless connection is established with the mobile device 130 or 160 in step 525, and before or after the vending machine data is transferred to that device. In some implementations, the reporting device 120 may only transfer vending machine data to an operator-owned mobile device 130. In some implementations, the reporting device 120 may also recognize a customer-owned mobile device 160.

At step 555, if the connected device belongs to an operator, the method can include issuing one or more reports based on the vending machine data transmitted. In some embodiments, the operator-owned mobile device 130 can reset certain counters of the reporting device 120 or VMC to reflect any cash, inventory, or maintenance activities performed during the stop. In some implementations, the transaction may conclude with transmitting the vending machine data to the server or a remote device 150. In other implementations, further inventory or diagnostic reports may be prepared and transmitted to the server or remote device 150. In this manner, the vending machine data can be uploaded to the remote device 150 without requiring the reporting device 120 to have a costly and energy-hungry cellular connection. This can reduce the operating cost of the reporting device 120 by simplifying installation, reducing maintenance, and reducing power requirements. In addition, it can allow the reporting device 120 to function in areas where no cellular signal is available, such as in basements and subways.

At step 565, if the connected device belongs to a customer, the method can include prompting the customer for permission to upload the vending machine data to the server. A customer-owned mobile device 160 may execute an application or app that facilitate purchases from the vending machine. Such an app may interface with the reporting device 120 or the VMC directly. In addition to the customer service functions of the app, subject to the appropriate user permissions, receive vending machine data from the reporting device 120 and upload it to a server for forwarding to a remote device 150.

At step 575, the method can include uploading the vending machine data to the server if permission is given. If the owner of the mobile-device 160 consents, the mobile device 160 may transfer the vending machine data over network connection 140 and either directly or indirectly to a remote device 150. In this manner, a route owner may receive information from the reporting device 120 without having to personally visit the vending machine 110, although such updates may be sporadic.

At step 585, the method can include rewarding the user with a promotional offer in return for providing the vending machine data to the server. To incentivize customers to help transfer vending machine data via network 140 as described with regard to step 575, a customer may be offered a promotional credit or points towards future purchases for each 1, 2, 5, 10, or other number of upload "assists." Customers may similarly receive credits for reporting low or empty inventories, or repair needs of the vending machine 110. If enough customers can be incentivized to assist in uploading vending machine data, the number of visits required to maintain the vending machine 110 by the route owner may be reduced, resulting in savings of time and money.

Figure 5B:
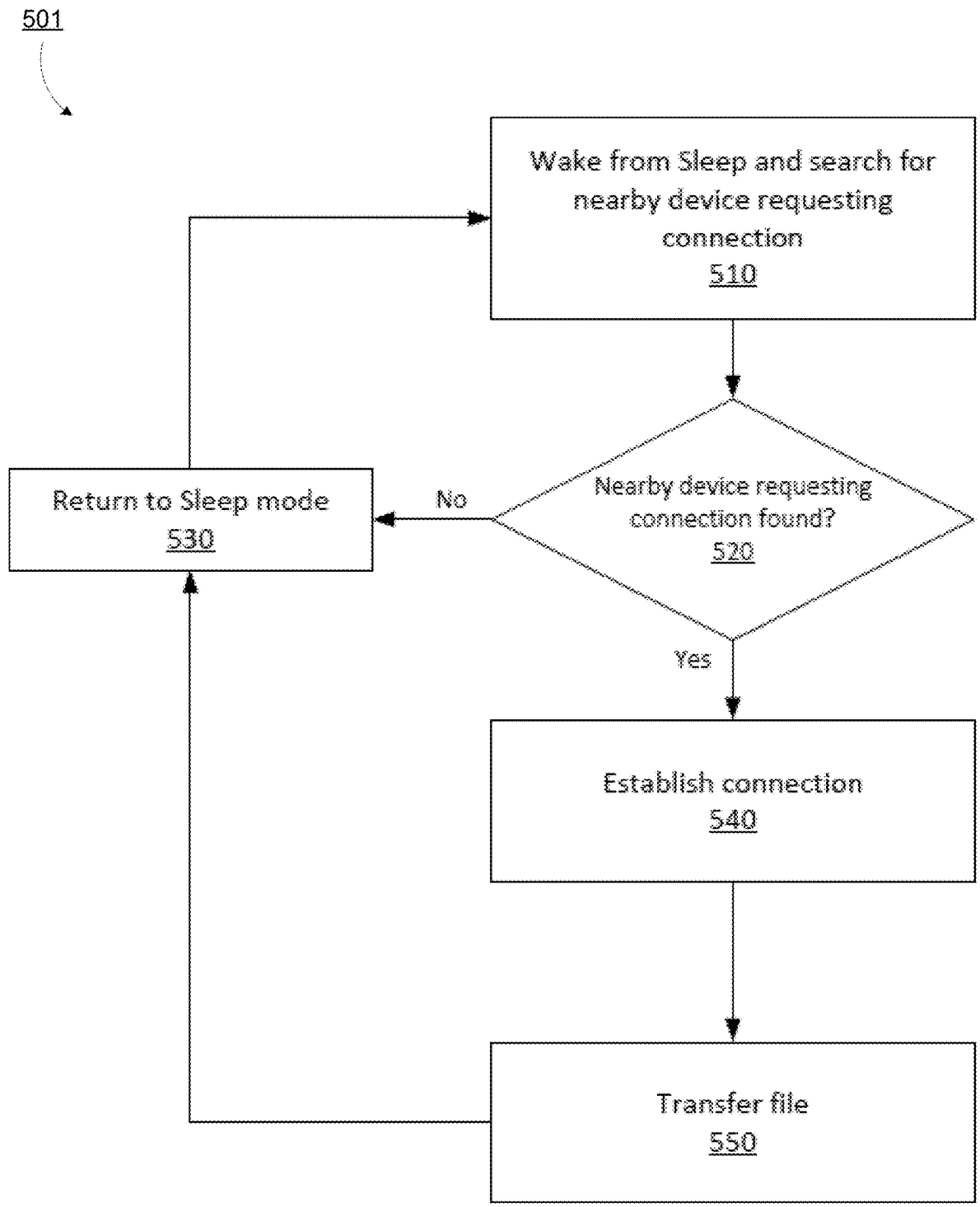

FIG. 5B is a flowchart of an embodiments of a method for transmitting a vending machine inventory report from a reporting device. In brief overview, the method 501 includes waking up from sleep and searching for nearby device (step 510), and determining whether a nearby device is requesting connection (step 520). If a nearby device was not found, the method includes returning to sleep (step 530). If a nearby device was found, the method includes establishing a connection with the device (step 540) and transferring a file to the device (step 550). The method may be performed by the reporting device 120.

Still referring to FIG. 5B, and in greater detail, the method includes waking from sleep and searching for nearby device (step 510). A processor 310 of the reporting device may wake up a wireless interface 340. A processor 310 may start a timer that will expire at an expiration of a first predetermined time. In some embodiments, the first predetermined time may be 0.1 seconds. In some embodiments, the first predetermined time may be between 0.1 seconds to 10 seconds. In some embodiments, the first predetermined time may be between 0.001 seconds to 30 seconds. The first predetermined time may be the time during which the wireless interface 340 will search for a mobile device 130, e.g. the wireless interface 430 of the mobile device 130. The first predetermined time may be stored in the memory 320 of the reporting device 120. The first predetermined time may be set or programmed according to specifications of the type of wireless interface 340. The first predetermined time may be programmable through firmware of the reporting device 120, over a wireless or a wired connection. In some embodiments, during the first predetermined time, the wireless interface 340 may attempt to connect to a wireless network, or attempt to establish a UNB or a cellular data connection. In some embodiments, the nearby device may be within 30 feet from the wireless interface 340. In some embodiments, the nearby device may be within broadcast range or a tower, a satellite, a UNB transceiver, etc. The location or distance between the device may depend on the type of wireless interface 340, wave interference, wave propagation, and/or wave characteristics that depend on wave frequency used by the wireless interface 340.

At step 520, the method includes determining whether the nearby device requesting connection is found. In some embodiments, the method includes determining whether the nearby device is sending a signal from an application executing in the nearby device. For instance, a report application 425 within a mobile device 130 may be attempting to connect with the wireless interface 340 of the reporting device 120. The method may include scanning throughout the first predetermined time period.

At step 530, if a nearby device has not been found, the method includes returning to sleep mode. The reporting device 120 may return to sleep mode for a second predetermined period of time, which may be stored in memory. In some embodiments, the second predetermined period of time may be 4.9 seconds. In some embodiments, the second predetermined period of time may be between 0.001 seconds to one week. In some embodiments, the processor 310 of the reporting device 120 and/or the reporting device 120 may be programmed to a specific duty cycle, e.g. 2%. For instance, if the second predetermined period of time is 4.9 seconds and the first predetermined period of time is 0.1 seconds, then the duty cycle for the switching is 2%. The processor 310 and/or the reporting device 120 may be programmable to a set duty cycle and a length of period, which may determine the first and second predetermined periods of time. The processor 310 and/or the reporting device 120 may be programmable through a firmware, over a wireless or a wired connection. In some embodiments, different values of first and second predetermined periods of time may be used to prolong battery life or to draw less power from the power source 360 of the reporting device 120.

At step 540, if a connection was found in step 520, the method includes establishing a connection. In some embodiments, a handshake is initiated. If the connection fails to be established, the reporting device 120 may attempt to look for additional nearby devices for the remaining duration of the first predetermined time as specified in step 510. In some embodiments, if a connection is failed, the reporting device 120 may return to step 510 to search for nearby devices for an additional first predetermined period of time. In some embodiments, the reporting device 120 may return to sleep mode in step 530 when an attempted connection fails. In some embodiments, a connection may be successfully established with a nearby device.

At step 550, if a connection is successfully established, the method includes transferring one or more files to the nearby device with which a connection was established. In some embodiments, one or more files are transferred from the memory 320 of the reporting device 120. In some embodiments, the one or more files are DEX files or data blocks. In some embodiments, the files are transferred from a temporary memory buffer. In some embodiments, the one or more files are from the reporting module 332 of the reporting device 120. After transferring one or more files to a nearby device, the reporting device 120 may return to sleep mode at step 530 as described above.

Figure 6:
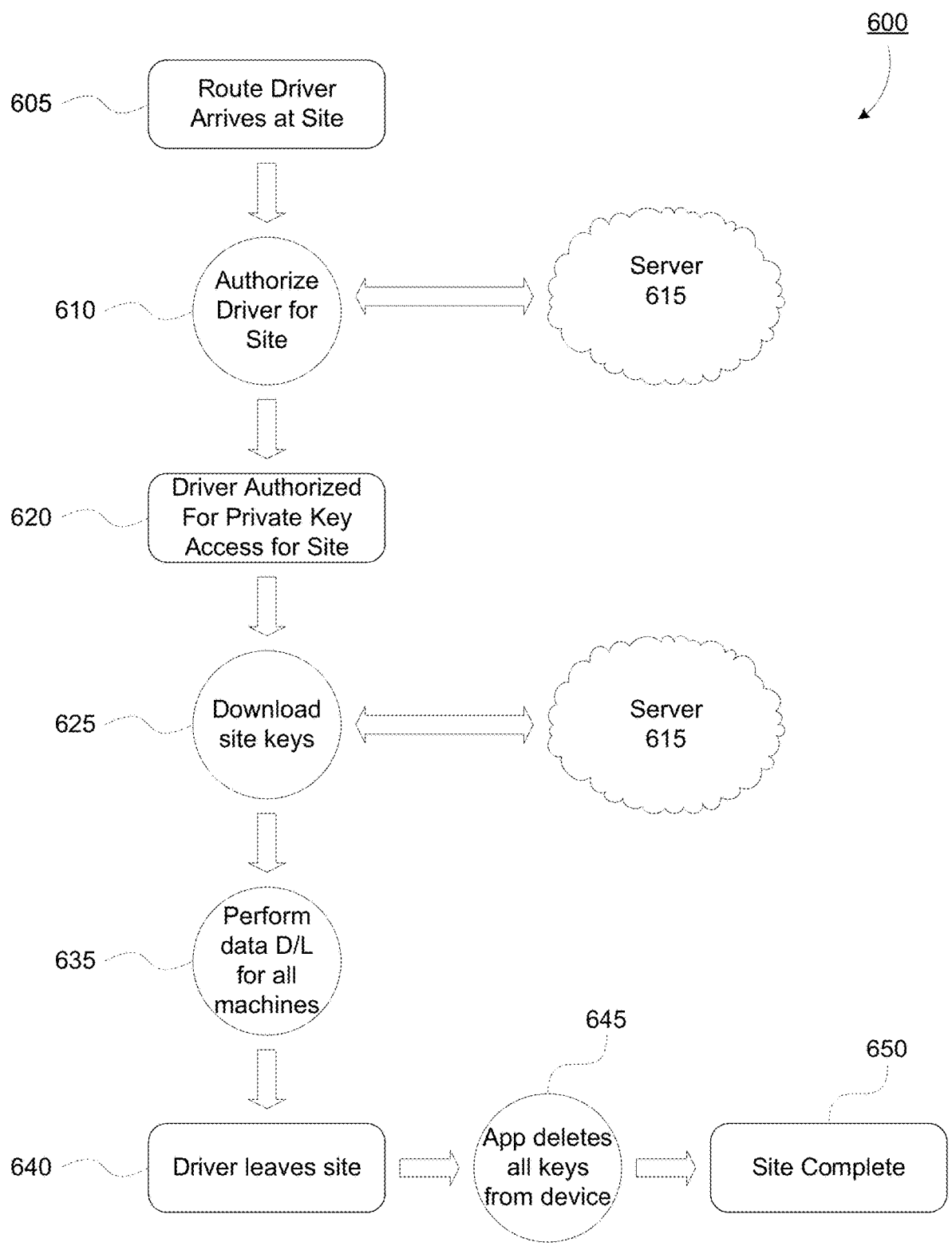
FIG. 6 is a flowchart of an embodiment of a method for authenticating a computing device for downloading vending machine data.

FIG. 6 is a flowchart of an embodiment of a method for authenticating a computing device for downloading vending machine data. The method 600 includes the route driver arriving at the site of the vending machine 110 (step 605), authorizing the route driver for the site using the server 615 (step 610), authorizing the driver for private key access for the site (step 620), downloading the site keys from the server 615 (step 625), performing the data download for one or more vending machines 110 (step 635), the drier leaving the site (step 640), the app deleting all private keys from the mobile device 130 (step 645), and completing the site (650).

Prior to deployment, a reporting device 120 must be provisioned. Provisioning may occur at a site of manufacture or distribution of the reporting device 120, and be performed by an authorized representative. The authorized representative can provision the reporting device 120 by programming both a serial number and a private key for the reporting device 120. Prior to provisioning, the reporting device 120 will broadcast its MAC address as part of the advertisement data to help distinguish it from other devices. The process of provisioning is described further with regard to FIG. 8. After provisioning, the reporting device 120 will broadcast the serial number as part of the advertisement packet and no longer the MAC address. Only an authorized user connecting to a provisioned reporting device 120 will be able to perform transfers of data from a connected vending machine 110. An unauthorized user can be automatically disconnected upon authentication failure for a provisioned reporting device 120. Any user connecting to a provisioned reporting device 120 can be automatically disconnected if authentication is not initiated within a predetermined time after connection; for example, 2 seconds. Any user can be automatically disconnected if authentication is not completed within a predetermined time after starting the authentication process; for example, 5 seconds.

Following deployment to a vending machine 110, a route driver or owner can interface with the reporting device 120 as follows. The route driver or owner's mobile device 130 can be authenticated both against the server 615 backend and with the reporting device 120. Reporting device 120 authentication can occur using a challenge response and an asymmetric key encryption. A provisioned reporting device 120 can, upon request only, provide a challenge data set. The challenge data can be encrypted using the private key for the reporting device 120 and sent back to the mobile device 130. The mobile device 130 can perform the same encryption step. Provided the encryption data matches, the mobile device 130 can be authenticated.

The method 600 can commence when the route driver carrying the mobile device 130 arrives at the site of the vending machine 110 (step 605). The route driver may be the route owner or another individual authorized to receive data from the vending machine 110. The site may have a single vending machine 110 or multiple vending machines 110. Typically each vending machine 110 will be associated with one reporting device 120. The mobile device 130 can register its arrival at the site by several means. For example, the mobile device 130 can recognize its proximity to the site by GPS. In such implementations, the app running on the mobile device 130 can use the GPS or other location services of the mobile device 130 to determine that the route driver is nearing the site. In this manner, the mobile device 130 can begin the authorization process and obtain private keys for the reporting devices 120 at the site prior to arrival. Obtaining authorization and the private keys in advance of arrival to the site can be especially helpful for visiting vending machines where cellular and wireless network connections are unavailable or unreliable, such as in subway stations or basements. In another example, the route driver can select the next site from a menu when departing the previous site, or while on route in between sites. In another example, the route driver can enter a code for the next site. The codes for each site can be changed periodically to increase security of the system. The codes can be entered manually by the route driver, printed on a machine-readable itinerary, or downloaded to the mobile device 130 weekly, daily, twice per day, or at some other appropriate interval.

The method can include authorizing the route driver for the site (step 610). This step can include contacting the server 615 using the mobile device 130 via network 140 to obtain authorization to receive data from the one or more reporting devices 120 at the site. As described above, this step 610 can be performed prior to the route driver's arrival at the site. The route drive can be authorized to receive the private keys necessary to contact the reporting device 120 at the site (step 620). The method can include downloading the private keys for the site from the server 615 (step 625).

The method 600 can include downloading the vending machine data from all of the reporting devices 120 at the site (step 635). This step can include all of the actions of steps 535 and 550 described above. Downloading can be accomplished for a single vending machine 110 and reporting device 120, or for multiple vending machines 110 and reporting devices 120 for which keys were obtained in steps 620 and 625.

The method 600 can include the route driver leaving the site (step 640). After the route driver has completed all data transfer, inventory stocking, and maintenance activities and left the site, the app can automatically delete all of the private keys from the mobile device 130 that were obtained in step 625 (step 645). The app can delete the private keys based on a confirmation from the route driver that the he has exited the site. In another implementation, the app can delete the private keys when the mobile device 130 loses its connection to the reporting device 120, as would occur when the distance between them becomes too great to maintain the connection. In another implementation, the app can delete the private keys when a location service of the mobile device 130 such as GPS indicates that the mobile device 130 has moved more than a threshold distance away from the site. In this manner, the route driver and the mobile device 130 can be authenticated for each visit, allowing multiple route drivers or mobile devices 130 to access the reporting device 120 without reducing security by allowing duplicate private keys to remain on multiple devices. The method 600 can conclude when the site visit is complete (step 650).

Figure 7:
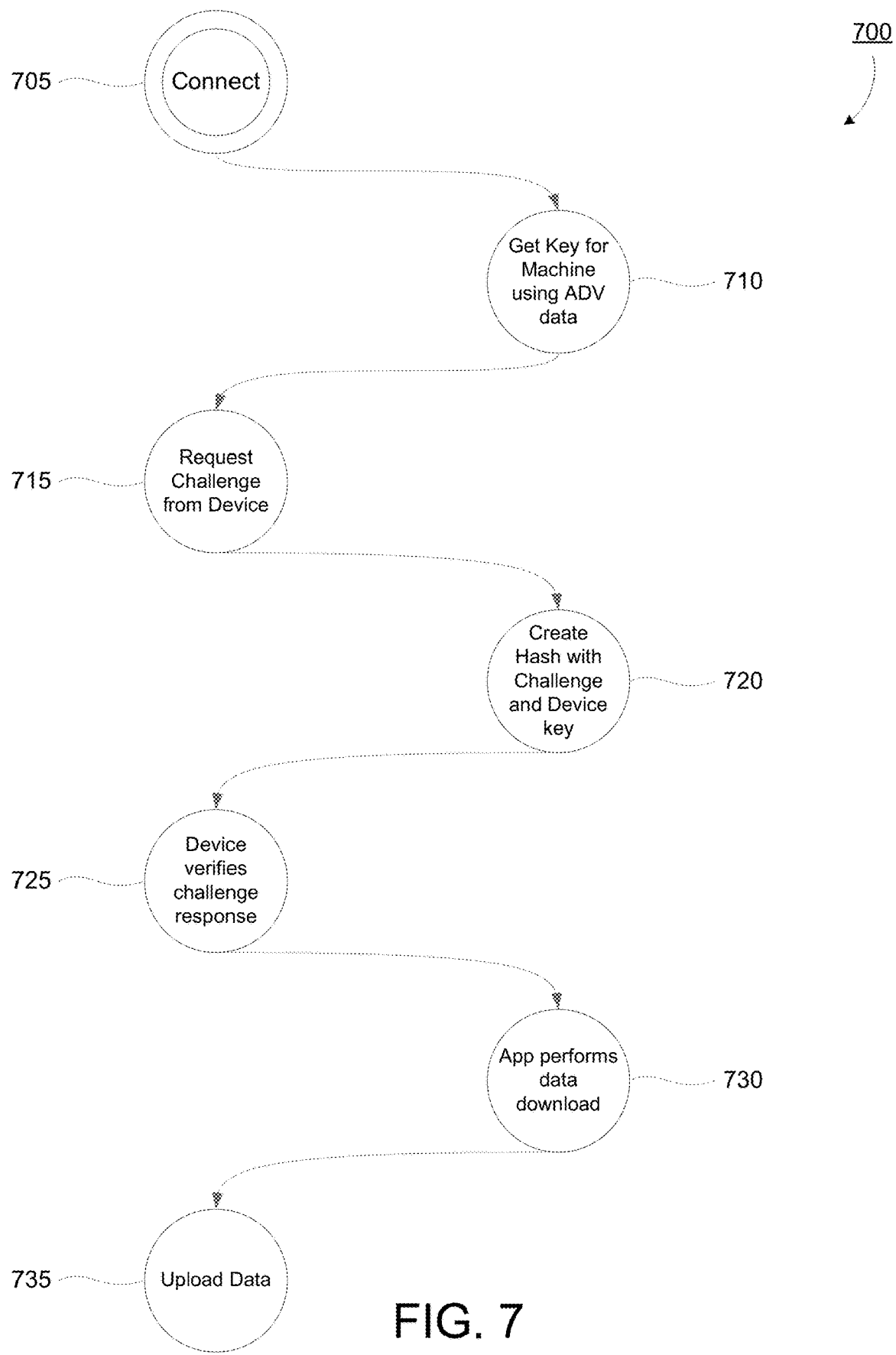
FIG. 7 is a flowchart of an embodiment of a method for authenticating a computing device for downloading vending machine data.

FIG. 7 is a flowchart of an embodiment of a method for authenticating a mobile device 130 for downloading vending machine data from a reporting device 120. This method 700 could also be performed by an app running on a customer-owned mobile device 160, if the customer allows for upload of vending machine data using the mobile device 160. The method can include connecting to the reporting device 120 (step 705), obtaining the private key for the reporting device 120 (step 710), requesting a challenge from the reporting device 120 (step 715), creating a hash with the challenge and the private key for the reporting device 120 (step 720), verifying the challenge response (step 725), downloading the data from the reporting device 120 (step 730), and uploading the data to a remote device 150 (step 735).

The method can include connecting to the reporting device 120 (step 705). As described above with regard to step 525, the reporting device 120 can wake up from a sleep mode periodically to search for a nearby mobile device 130 or 160. If a connection is established, the authentication process can begin with the mobile device 130 obtaining the private key for the reporting device 120 (step 710). The mobile device 130 can obtain the private key from the key storage server 615. If the authorization process is not commenced within a predetermined time following the connection, the reporting device 120 can disconnect from the mobile device 130.

The method can include requesting a challenge from the reporting device 120 (step 715). The mobile device 130 sends a request to the reporting device 120 for a challenge. The reporting device 120 can issue a challenge to determine that the mobile device 130 has been authorized for the site.

The method can include creating a hash with the challenge and the private key for the reporting device 120 (step 720). The mobile device 130 can take receive the challenge from the reporting device 120 and create a hash with the challenge and the private key. The mobile device 130 can transmit the result of the hash back to the reporting device 120.

The method can include verifying the challenge response (step 725). The reporting device 120 can receive the result of the hash from the mobile device 130 and verify that the mobile device 130 is in possession of a valid private key. If the mobile device 130 is unable to respond correctly to the challenge within a predetermined time following issuance of the challenge, the reporting device 120 can disconnect from the mobile device 130.

The method can include downloading the data from the reporting device 120 (step 730). If the mobile device 130 adequately responds to the challenge, the reporting device 120 can transfer the vending machine data to the mobile device 130.

The method can include uploading the data to a remote device 150 (step 735). The mobile device 130 can upload the vending machine data received from the reporting device 120 to a remote device 150 via the network 140. The mobile device 130 can also upload the vending machine data to a server such as server 615 so that it may be accessed by multiple remote devices 150.

Figure 8:
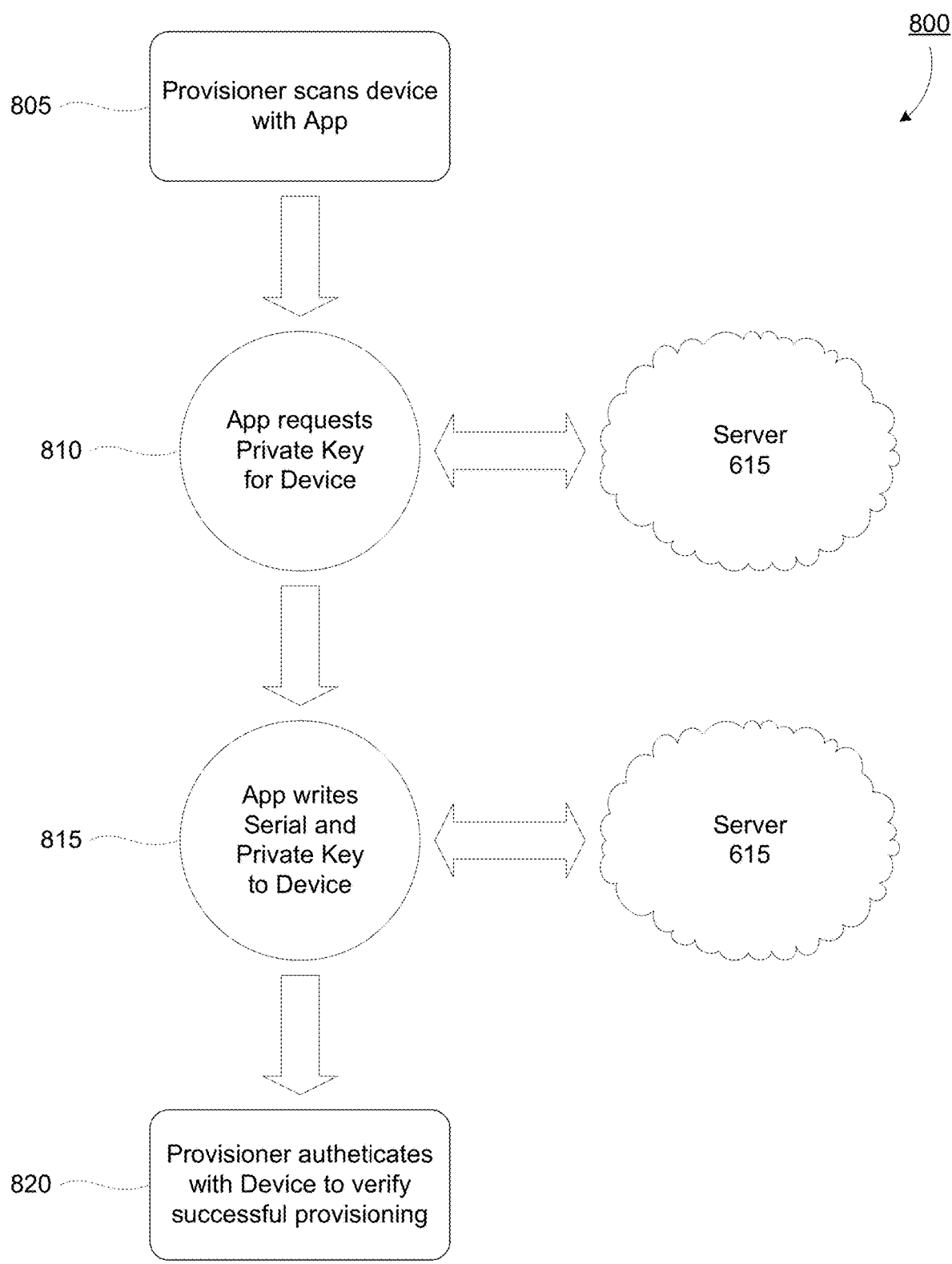
FIG. 8 is a flowchart of an embodiment of a method for provisioning a communication device for a vending machine.

FIG. 8 is a flowchart of an embodiment of a method for provisioning a communication device for a vending machine. The method 800 can include scanning a reporting device 120 (step 805), requesting a private key for the reporting device 120 from a server 615 (step 810), writing a serial number and the private key to the reporting device 120 (step 615), and authenticating with the reporting device 120 to verify successful provisioning (step 820).

A new reporting device 120 may need to be provisioned before use. A reporting device 120 can be provisioned by uploading the device serial number to the server. An authorized individual can upload the serial number to the server using a mobile device 130 or a remote device 150. The server should in turn generate a private key for the device and send this information back to the app on the mobile device 130 or remote device 150. Both pieces of data are then written to the reporting device 120. The app can then issue an authentication challenge request to ensure the provisioning process was performed successfully. Un-provisioned reporting devices 120 may not be protected. A user is authenticated by using an asymmetrical encryption scheme involving a unique challenge generated by the reporting device 120 and the device's private key. A provisioned reporting device 120 cannot be provisioned a second time since the provisioning information is not encrypted. It can be possible for a provisioned reporting device 120 to be un-provisioned by an authorized representative.

The method 800 can include scanning a reporting device 120 (step 805). The new, un-provisioned reporting device 120 can have the serial number affixed to it via a sticker having a computer readable label such as a bar code or QR code. A mobile device 130 or a remote device 150 executing the appropriate app can read the code to obtain the serial number of the un-provisioned reporting device 120. Alternatively, the serial number can be entered into the app manually.

The method 800 can include requesting a private key for the reporting device 120 from a server 615 (step 810). The app can take the serial number read or entered into the app in the previous step and transmit it to the server 615. The server 615 can take the serial number and generate a private key, which can be transmitted back to the device executing the app.

The method 800 can include writing a serial number and the private key to the reporting device 120 (step 615). The app can write the serial number and the private key to memory 320 of the reporting device 120. The serial number can serves as the device identifier 326 of the reporting device 120. The reporting device 120 should now be successfully provisioned.

The method 800 can include authenticating with the reporting device 120 to verify successful provisioning (step 820). A mobile device 130 can then attempt to connect to the provisioned reporting device 120 and perform authentication steps as described with regard to FIG. 7. If authentication is successful, the reporting device 120 can be verified as successfully provisioned.

Figure 9:
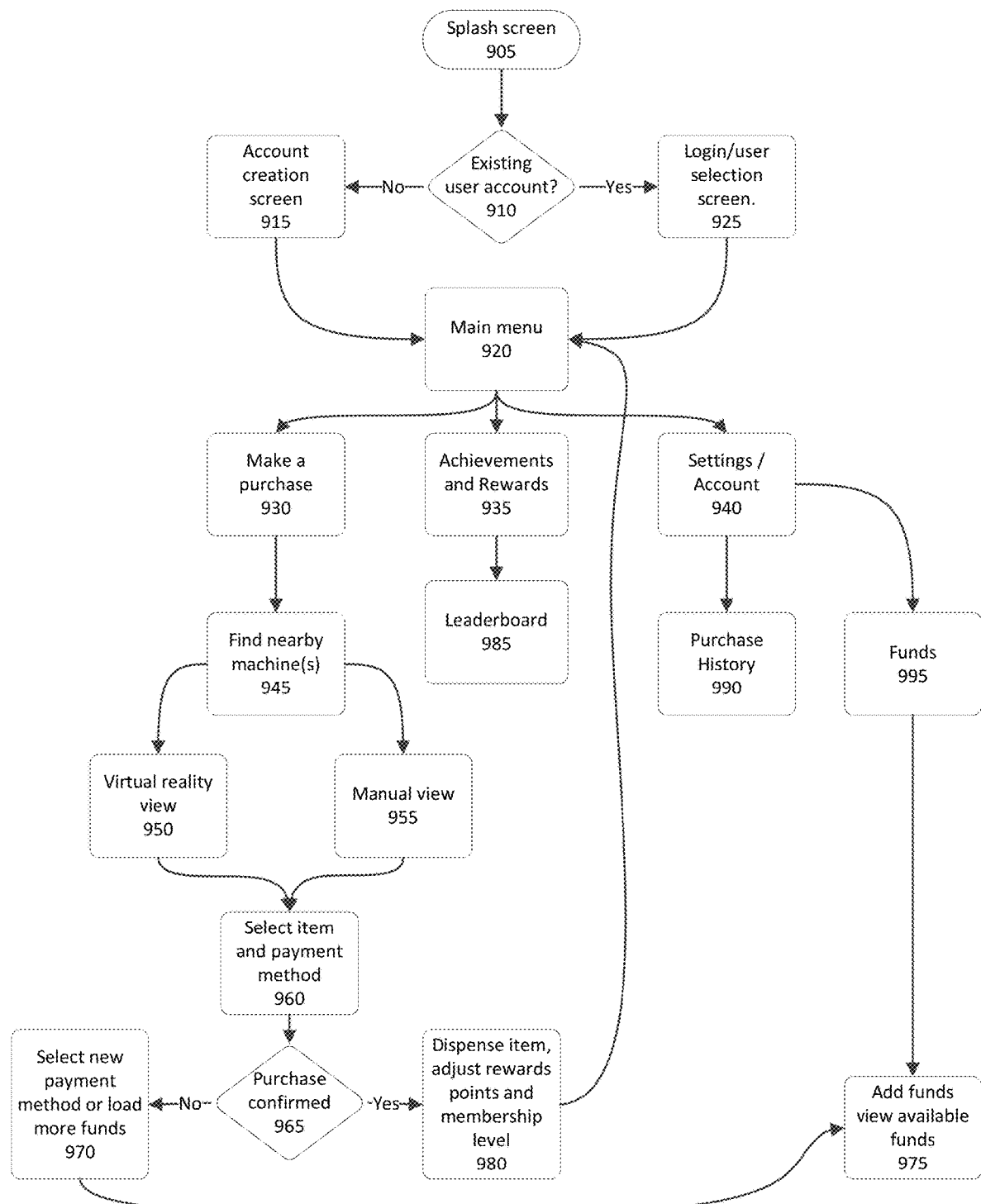
FIG. 9 is a flowchart of an embodiment of a software interface for facilitating a vending machine purchase from a computing device using a communication device for a vending machine.

FIG. 9 is a flowchart of an embodiment of a software interface for facilitating a vending machine purchase from a mobile device using a communication device for a vending machine. To use the software, a front-end user must have an account and be logged into that account within the software running on a mobile device 160. The front-end user can launch the an app to make a purchase from an equipped vending machine 110. Upon launching the app, the app can locate nearby vending machines 110 installed with a reporting device 120 are wirelessly located automatically. The front-end user can select from inventory in the vending machine 110 using one of two views in the app: an augmented reality view or a computer generated view. The augmented reality view requires real-time and clear optical data of the vending machine 110. The computer generated view requires a stable connection to the network 140 to represent the vending machine's 110 current inventory. The user can submit corrections to the vending machine's 110 inventory levels, and report problems with the machine. Reporting inventory corrections or machine problems may be rewarded with a user reputation system, that may influence rate at which user accrues rewards points and climbs the leaderboard.

The software can provide nutrition, pricing, and marketing information about available inventory in the vending machine 110 to the front-end user. The front-end user can select and purchase an item from the inventory, if there are sufficient funds in the account, by inserting cash into the vending machine 110, or by redeeming an earned reward credit. The front-end user may add funds to their account within the app by authorizing a transaction with a credit card, debit card, or other method of payment. Completed purchases can be recorded for the front-end user. Completed purchases can be made available to review in the front-end user's account history. Completed purchases can also contribute to unlock various achievements, earn badges for such achievements, share achievements using social media, and raise the user's ranking on a leaderboard. The app will analyze completed and incomplete purchases to automatically make purchase suggestions to the front-end user, and for marketing or advertising purposes.

Upon launching the app, the app can present the front-end user with the splash screen 905. The app can present the user with a login screen 910 with an option to create an account. If the user lacks an existing account, the app can direct the user to the account creation screen 915 for entry of information necessary to create an account. Following account creation, the app can present the user with the main menu 920. If the user has an existing account, the app can present the login/user selection screen 925. Following a successful login, the app can present the user with the main menu 920.

The main menu screen 920 of the app can present the user with several options. The user can select whether to go to a purchase screen 930, an achievements and rewards screen 935, or a settings and account screen 940. From the purchase screen 930, the app can present the user with a search screen 945 where the user can search for nearby vending machines 110. If a nearby vending machine can be located, the app can offer a virtual reality view 950 of the vending machine 110, or a manual view 955. The manual view 955 can simply include the user viewing the vending machine normally without aid from the app. The app can present a user with an item and payment selection screen 960. The app can confirm the purchase 965. The app may decline to confirm the purchase if the user's account does not contain sufficient funds. In such case, the app may present the user with a screen for selecting a new payment method or loading more funds 970. The app can present the user with the add funds screen 975. The app can confirm the purchase if the user's account contains sufficient funds for the purpose. In such case, the app can direct the vending machine 110 to dispense the item, and can adjust the reward points and membership level of the user accordingly 980. The app can return the user to the main menu 920.

The app can present the user with an achievements and rewards screen 935. This screen can present the user with accumulated achievements and rewards, including any credits earned towards purchases. The app can present the user with a leaderboard 985 that can present the user's rewards and achievements compared to other users.

The app can present the user with a settings and account screen 940. This screen can present the user with account information such as user name and the option to change the account password, as well as app settings such as payment information. The app settings can include permissions for operations such as uploading vending machine data to the server 615 using the wireless or cellular network connection of the mobile device 160. The app can present the user with a purchase history 990. The app can present the user with a balance of funds 995 screen. From the balance of funds screen 995, the app can present the user with the add funds screen 975.

Figure 10:
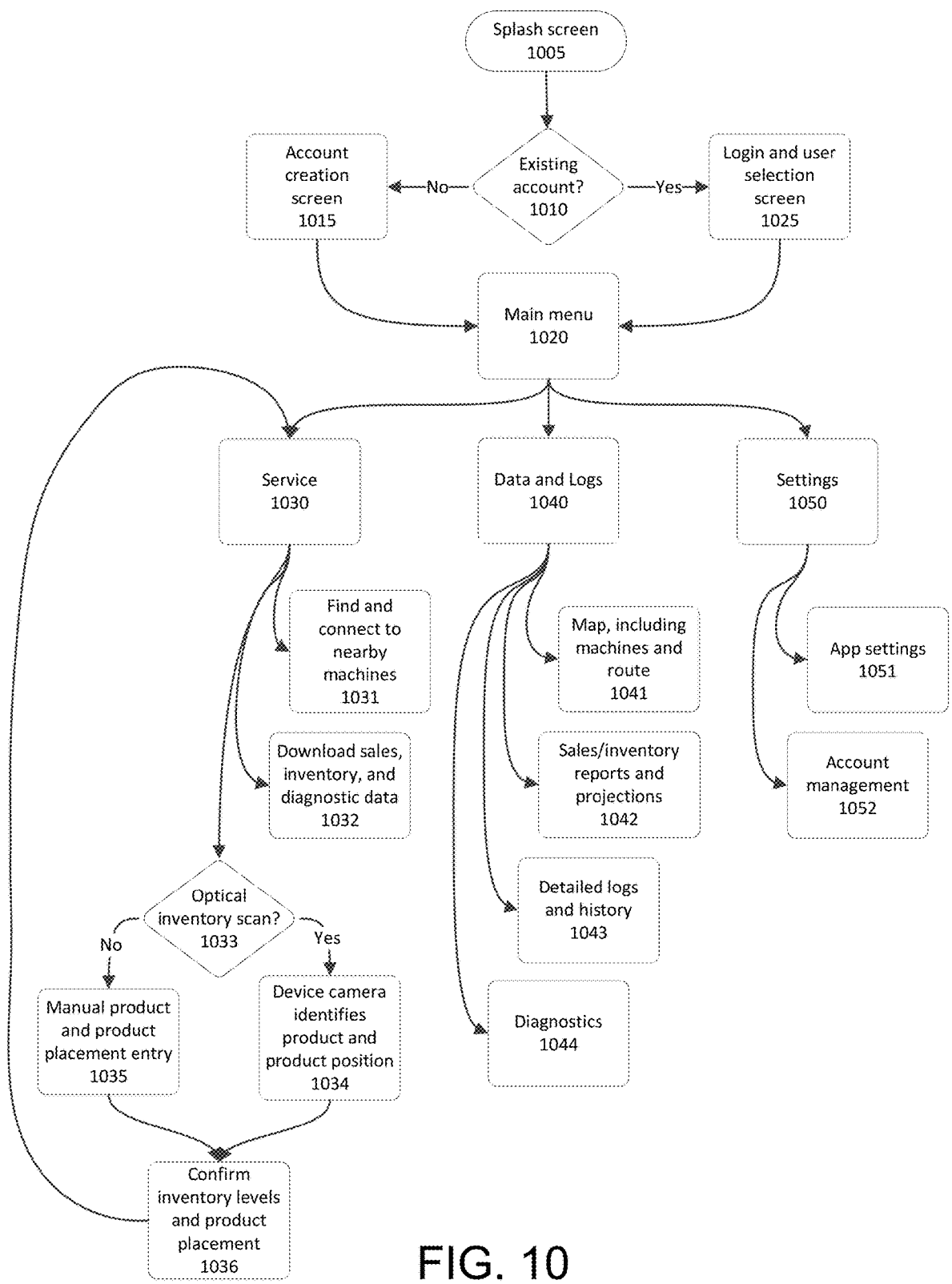
FIG. 10 is a flowchart of an embodiment of a software interface for managing a communication device for a vending machine with a computing device.

FIG. 10 is a flowchart of an embodiment of a software interface for managing a communication device for a vending machine with a computing device. To use the software, a back-end user must have an account and be logged into that account within the software. The back-end user is able to access the software using a third-party mobile device or within a web-browser. The back-end user is only able to connect to a vending machine 110 installed with the hardware previously activated from the logged-in account. A back-end user running the software on a third-party mobile device can automatically connect to nearby one or more vending machines 110. Data generated by the vending machine 110 after the last synchronization can be automatically downloaded to the software. If present, critical and urgent information, like component failures, can be visually and audibly annunciated to the back-end user until resolved or dismissed. If there is no critical or urgent information, the software can prompt the back-end user to hold the third-party device so the software can optically scan the inventory in the vending machine. The software can utilize image and pattern recognition to automatically detect what products are currently stocked as inventory and their relative position in the vending machine 110. The software can prompt the back-end user to confirm and correct the identification and placement of products.

Upon launching the app, the app can present the front-end user with the splash screen 1005. The app can present the user with a login screen 1010 with an option to create an account. If the user lacks an existing account, the app can direct the user to the account creation screen 1015 for entry of information necessary to create an account. Following account creation, the app can present the user with the main menu 1020. If the user has an existing account, the app can present the login/user selection screen 1025. Following a successful login, the app can present the user with the main menu 1020.

The main menu screen 1020 of the app can present the user with several options. The user can select whether to go to a service screen 1030, a data and logs screen 1040, and a settings screen 1050. From the service screen 1030, the app can prompt the user to find and connect to any nearby vending machines 110 1031. The app can download sales, inventory, and diagnostic data from the reporting device 120 1032. The app can also assist the user with inventory management tasks. The app can ask the user whether it would like to perform an optical inventory scan 1033. If the user wishes, the app can use a camera of the mobile device 130 to capture an image of the item contents of the vending machine 110 1034. The app can employ image recognition capabilities to determine which products are in which places in the vending machine 110, and compile an inventory based on one or more images captured with the camera. Alternatively, the user can manually enter the vending machine 110 inventory via a manual product and placement entry screen 1035. In either case, the app can present the user with an inventory level and product placement confirmation screen 1036. The resulting product-based inventory can be combined with the transaction-based inventory determined from the vending machine data to provide records suitable for compliance audits; for example, to show that the vending machine owner is complying with stocking and placement agreements with product manufacturers. The user can return to the service screen 1030 of the app and repeat the process for any additional vending machines 110 at the site.

The app can present the user with a data and logs screen 1040. This screen can present the user with several options for viewing information about vending machines 110 associated with the user's account. The app can present the user with a map including vending machines 110 and a route 1041. The app can present the user with sales and inventory reports and projections 1042. The app can present the user with detailed logs and history 1043. The app can present the user with a diagnostics screen 1044.

The app can present the user with a settings screen 1050. This screen can present the user for several options for adjusting setting associated with the app. The app can present the user with an app settings screen 1051 for adjusting the behavior of the app. The app can present the user with an account management screen 1052 for modifying account parameters such as username and password and various permissions.

Figure 11:
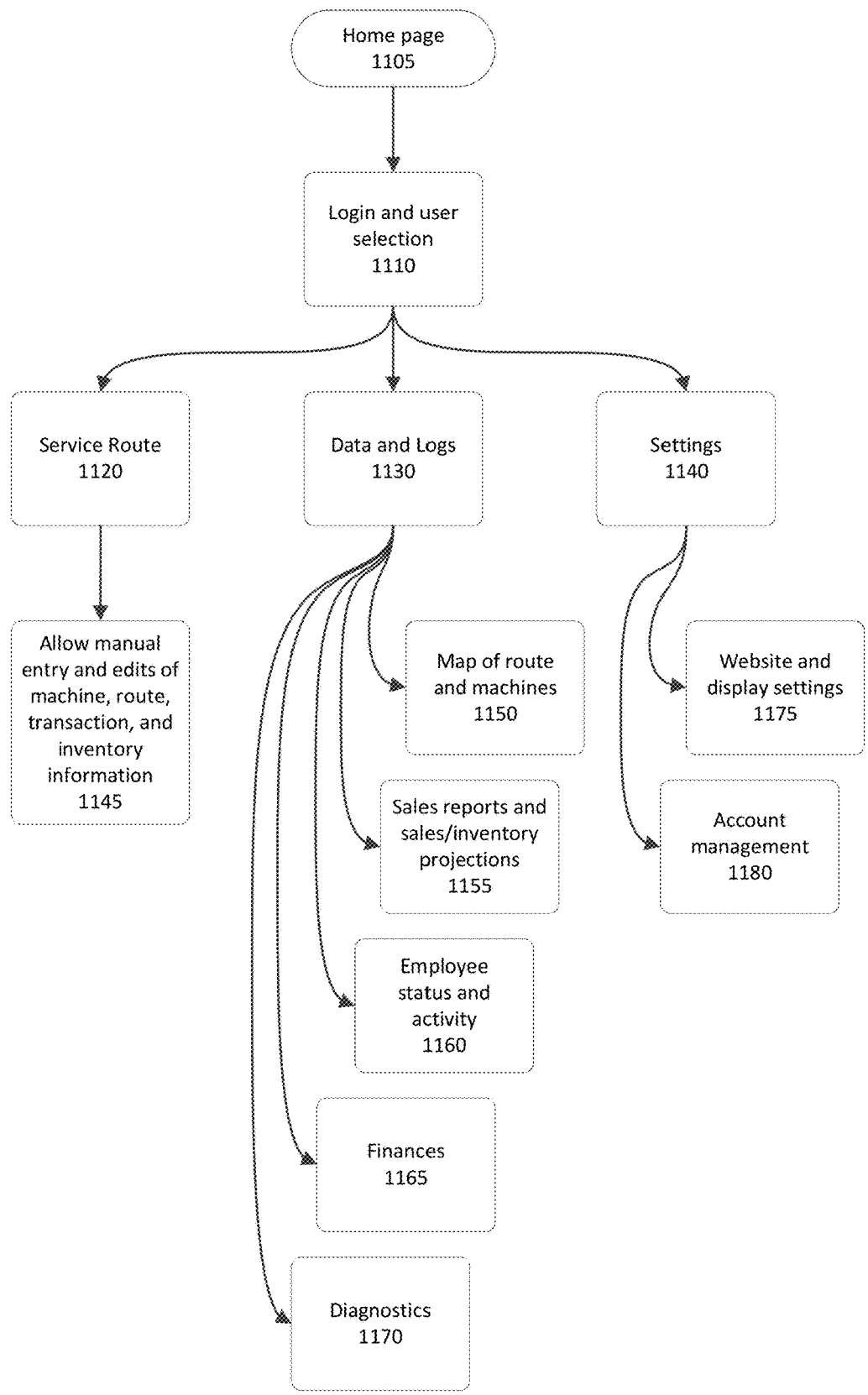
FIG. 11 is a flowchart of an embodiment of a software interface for managing a communication device for a vending machine with a computing device.

FIG. 11 is a flowchart of an embodiment of a software interface for managing a communication device 130 for a vending machine with a remote device 150. A back-end user running the software within a web-browser may be unable to automatically connect to machines. Sales and inventory data may thus be edited or manually entered using this version of the software. Both the mobile and desktop versions of the software can allow access to account management, historical sales, and inventory reports from vending machines 110 associated with the account, and location information for vending machines 110 associated with the account. The software can automatically generate sales and inventory reports for the back-end user. The software can also generate automatic suggestions, including price changes, product offerings, and product placement, to increase sales and decrease waste for each vending machine 110. The software can generate these suggestions using information from vending machines 110 associated with the back-end user's account, as well as aggregate data from all vending machines 110 equipped with the reporting device 120. The software can also record usage of the hardware and software by back-end users, for the tracking of employee performance.

The software can present the user with a home page 1105. From the home page 1105, the software can present the user with a login and user selection page 1110. Following a successful login or account creation, the software can present the user with several options. The software can present the user with a service route page 1120. The software can present the user with a data and logs page 1130. The software can present the user with a settings page 1140.

The software can present the user with the service route page 1120, which can bring the user to a vending machine and route information page 1145. The vending machine and route information page 1145 can present the user with options for manually entering and editing route information, vending machine information, and inventory information.

The software can present the user with the data and logs page 1130. From this page 1130 the user can navigate to several informational pages about the vending machines and routes. The software can present the user with maps of routes and vending machines on page 1150. The software can present the user with sales reports and sales and inventory projections on page 1155. The software can present the user with the status and activity of employees such as route drivers on page 1160. The software can present the user with financial reports on page 1165. The software can present the user with diagnostic information about the vending machines on page 1170.

The software can present the user with a settings page 1140. From this page 1140 the user can navigate to a display settings page 1175. The display settings page 1175 can present the user with options for adjusting the layout and behavior of the various pages presented by the software. The user can navigate to an account management page 1180. The account management page 1180 can present the user with options for modifying account parameters such as username and password.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations. For example, although the systems and methods described herein may be described generally with an agent and native contact application, these systems and methods may be implemented by an application, such as a non-native application or the native application itself. In one implementation, the native contact app may include any of the implementations of the agent described herein. In another implementation, the agent may provide the functionality of a contacts application (native or non-native) and update the agent's contact database instead of another application, such as the native contact application.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A vending machine management system comprising:
   a vending machine interface receiving vending machine data;
   a Dalvik Executable (DEX) reporting module configured to generate a DEX file based on the vending machine data;
   a Bluetooth Low Energy (BLE) module configured to transmit the contents of the DEX file to a computing device;
   a processor configured to break transmission blocks received from the DEX reporting module into packets; and
   a BLE module controller configured to receive the packets from the processor and to send the packets to the BLE module.

2. The vending machine management system of claim 1, wherein:
   the BLE module, the processor, and the BLE module controller are included in a reporting device configured to attach to a vending machine; and
   the BLE module is configured to function as a slave to at least one of the processor and the BLE module controller.

3. The vending machine management system of claim 2, wherein:
   the BLE module and the BLE module controller are configured to communicate via a Master-In, Slave-out (MISO) port.

4. The vending machine management system of claim 1, wherein:
   the BLE module controller is configured to function as a serial peripheral interface.

* * * * *